(12) United States Patent
Budarin et al.

(10) Patent No.: US 8,790,548 B2
(45) Date of Patent: Jul. 29, 2014

(54) CARBONACEOUS MATERIALS

(75) Inventors: Vitaliy Budarin, York (GB); James Hanley Clark, York (GB); Rafael Luque, York (GB); Duncan James MacQuarrie, York (GB); Krzysztof Milkowski, York (GB); Robin Jeremy White, York (GB)

(73) Assignee: University of York, York (GB)

( * ) Notice: Subject to any disclaimer, the term of this patent is extended or adjusted under 35 U.S.C. 154(b) by 816 days.

(21) Appl. No.: 12/282,981

(22) PCT Filed: Mar. 15, 2007

(86) PCT No.: PCT/EP2007/052482
§ 371 (c)(1),
(2), (4) Date: Sep. 15, 2008

(87) PCT Pub. No.: WO2007/104798
PCT Pub. Date: Sep. 20, 2007

(65) Prior Publication Data
US 2009/0078913 A1    Mar. 26, 2009

(30) Foreign Application Priority Data

Mar. 15, 2006 (GB) .................................. 0605195.7
Apr. 28, 2006 (GB) .................................. 0608438.8

(51) Int. Cl.
| | | |
|---|---|---|
| *H01B 1/00* | (2006.01) | |
| *H01B 1/12* | (2006.01) | |
| *H01B 1/04* | (2006.01) | |
| *C01B 31/00* | (2006.01) | |
| *C01B 31/02* | (2006.01) | |
| *C08B 31/00* | (2006.01) | |
| *C08B 33/00* | (2006.01) | |
| *C08B 35/00* | (2006.01) | |
| *C08B 37/00* | (2006.01) | |
| *D01F 9/16* | (2006.01) | |
| *C07H 1/00* | (2006.01) | |
| *C07H 3/00* | (2006.01) | |
| *B01J 21/18* | (2006.01) | |

(52) U.S. Cl.
USPC ..... 252/502; 252/500; 423/445 R; 423/447.9; 536/102; 536/123.1; 536/124; 502/180

(58) Field of Classification Search
USPC ................... 252/500, 502; 423/445 R, 447.9; 536/102, 123.1, 124; 502/180
See application file for complete search history.

(56) References Cited

U.S. PATENT DOCUMENTS

| | | | |
|---|---|---|---|
| 3,135,739 A * | 6/1964 | Hjermstad et al. ............ 536/111 |
| 5,958,589 A | 9/1999 | Glenn et al. | |
| 6,812,187 B1 * | 11/2004 | Pak et al. ....................... 502/180 |
| 2003/0094172 A1 * | 5/2003 | Bengs et al. .................... 127/67 |
| 2005/0169829 A1 | 8/2005 | Dai et al. | |
| 2005/0207962 A1 * | 9/2005 | Dietz et al. ................ 423/445 R |
| 2005/0252373 A1 | 11/2005 | Shiflett et al. | |
| 2006/0272548 A1 | 12/2006 | Yoshida et al. | |
| 2007/0116624 A1 | 5/2007 | Joo et al. | |

FOREIGN PATENT DOCUMENTS

| | | |
|---|---|---|
| EP | 1369441 | 12/2003 |
| EP | 1 615 279 A | 1/2006 |
| WO | WO02053598 | 7/2002 |
| WO | WO 2005/011836 | 2/2005 |
| WO | WO2007088163 | 8/2007 |
| WO | WO2007099989 | 9/2007 |
| WO | WO2007126118 | 11/2007 |
| WO | WO2009037354 | 3/2009 |

OTHER PUBLICATIONS

Budarin, et al., 'Starbons: New starch-derived mesoporous carbonaceous materials with tunable properties,' *Angewandte Chemie*—International Edition, 45(23):3782-3786 (2006).
Budarin, et al., 'Versatile mesoporous carbonaceous materials for acid catalysis,' *Chemical Communications*, 634-636 (2007) (First published as an Advance Article on the web Nov. 14, 2006).
James H. Clark, 'Green Chemistry: today (and tomorrow),' *Green Chemistry*, 8:17-21 (2006) (First published as an Advance Article on the web Dec. 2, 2005).
Matisova, et al., 'Novel Porous Carbons and their Utilization in Trace Analysis,' *Chemical Papers*, 53(1):40-48 (1999).
Kachkarova-Sorokina, et al., "A novel clean catalytic method for waste-free modification of polysaccharides by oxidation," *Chem. Comm.*, 2844-45(2004).
Antonio, et al., "Quantification of sugars and sugar phosphates in *Arabidopsis thaliana* tissues using porous graphite carbon liquid chromatography-electrospray ionization mass spectrometry," *Journal of Chromatography*, A1172(170-178 (2007).
Budarin, et al., "Towards a bio-based industry: Benign catalytic esterifications of succinic acid in the presence of water," *Chem. Eur. J.*, 2007 Wiley-VCH Verlag GmbH & Co., KGaA, Weinheim, 13(24):6914-69919 (2007).
Hanai, "Separation of polar compounds using carbon columns," *Journal of Chromatography*, A:989:183-196 (2003).
Knox, et al., "Structure and Performance of Porous Graphitic Carbon in Liquid chromatography," *Journal of Chromatography*, 352:3-25 (1986).
International Search Report and Written Opinion in Application No. PCT/EP2008/062584, dated Feb. 25, 2009.
Search report in Application No. G80718263.7, dated Feb. 14, 2008.
Office Action dated Dec. 17, 2010 in related European Patent Application No. 07726967.8.

\* cited by examiner

*Primary Examiner* — Harold Pyon
*Assistant Examiner* — Tanisha Diggs
(74) *Attorney, Agent, or Firm* — Kilpatrick Townsend & Stockton LLP; Christopher M. Durkee, Esq.; Jamie L. Graham, Esq.

(57) ABSTRACT

A carbonaceous material is derived from a polysaccharide by carbonization. The polysaccharide is preferably a starch. The carbonaceous material has mesoporosity and is useful as a solid catalytic support.

23 Claims, 16 Drawing Sheets

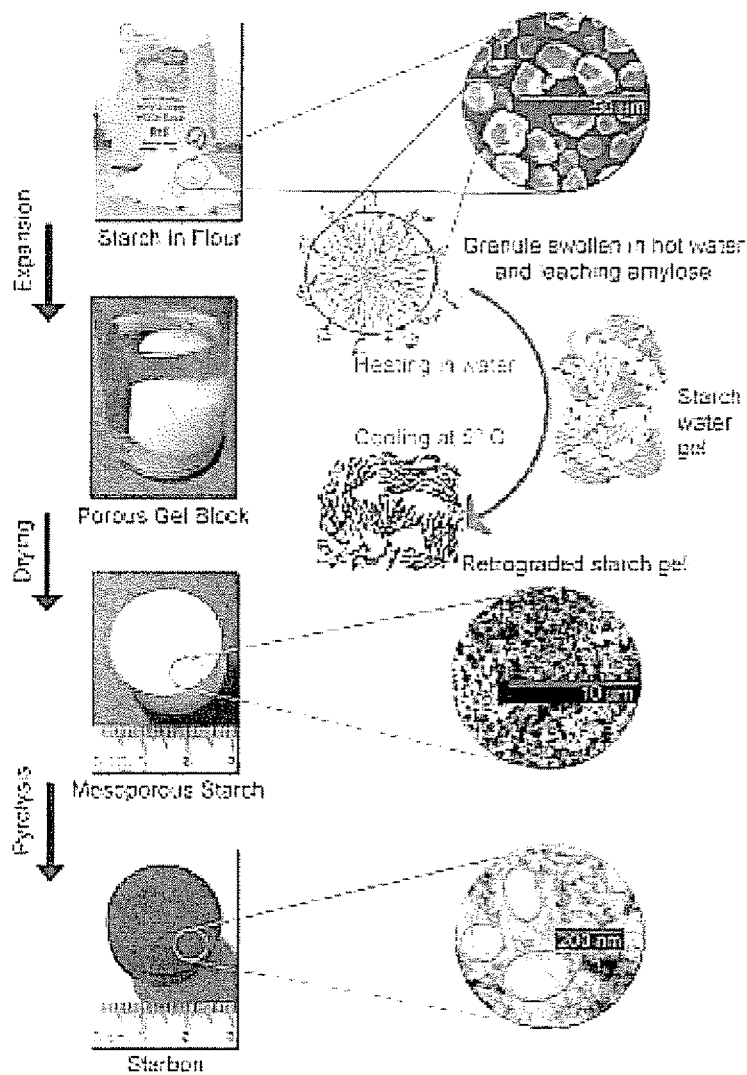
Fig. 1: Diagram indicating the stages involved in converting starch starting material (eg flour) into Starbon.

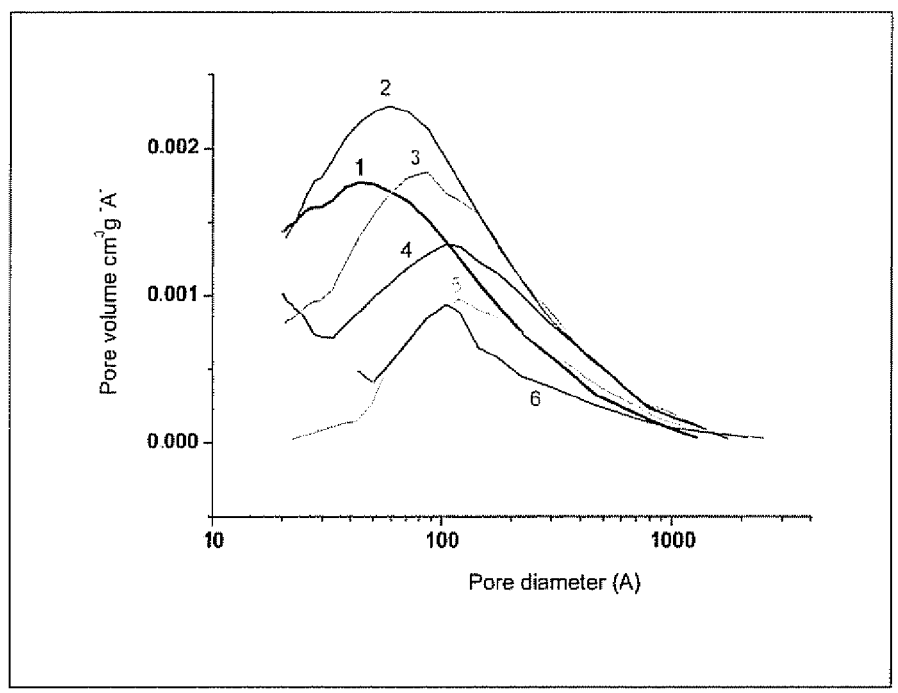
1 = Expanded starch, 2 = mixture of expanded starch and acid catalyst, 3 = Starbon – 100°C, 4 = Starbon -150°C, 5 = Starbon – 220°C, 6 = Starbon – 450°C
Fig. 2: The effect of heating on the porous structure of expanded starch
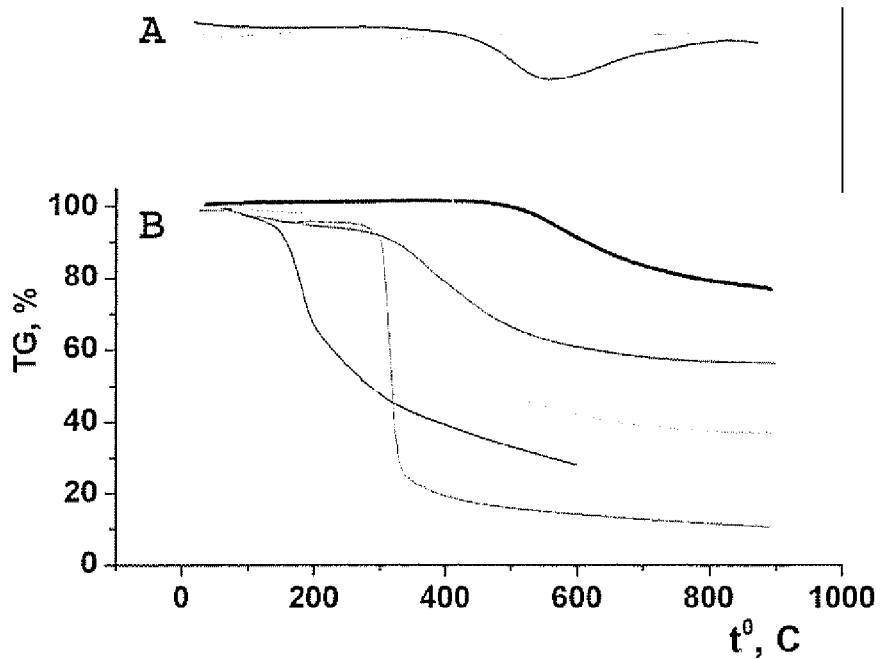
1 = Expanded starch, 2 = mixture of expanded starch and acid catalyst, 3 = Starbon – 100°C, 4 = Starbon – 220°C, 5 = Starbon – 450°C
Fig. 3: Simultaneous thermal analysis of starbons

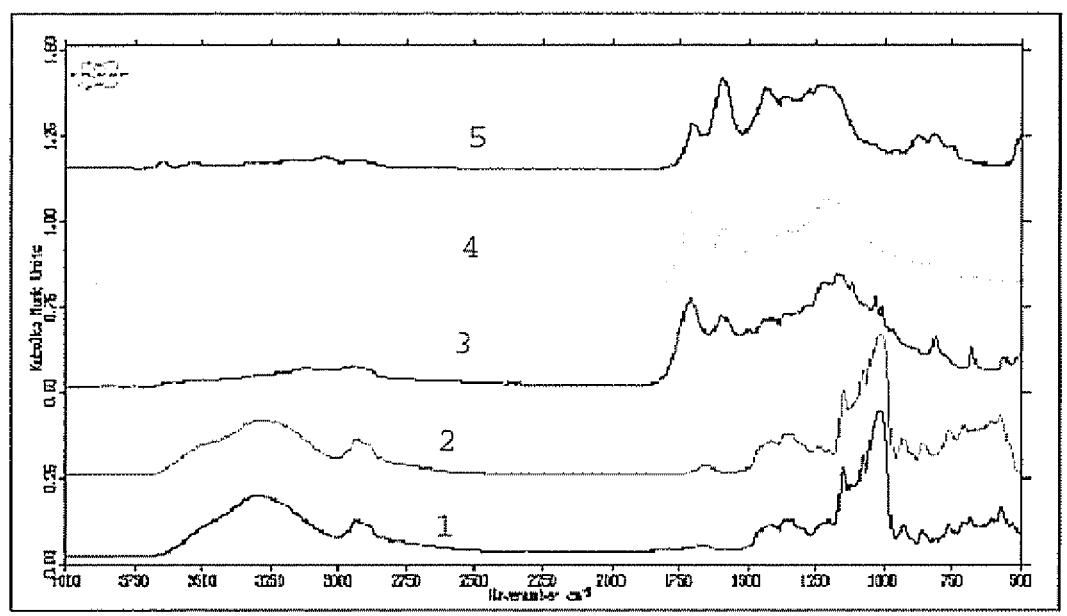
1 = Expanded starch, 2 = mixture of expanded starch and acid catalyst, 3 = Starbon - 220°C,
4 = Starbon - 300°C, 5 = Starbon - 450°C
Fig. 4: Infrared spectra

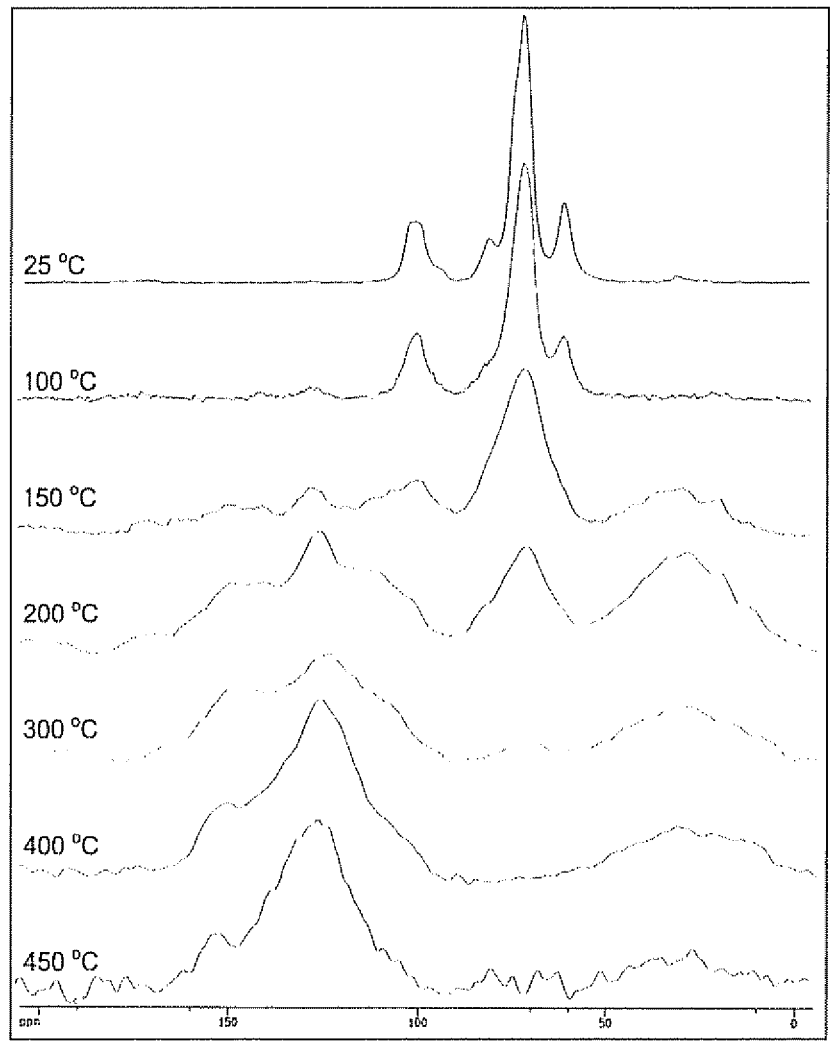
Fig. 5: $^{13}$C MAS NMR of Starbons

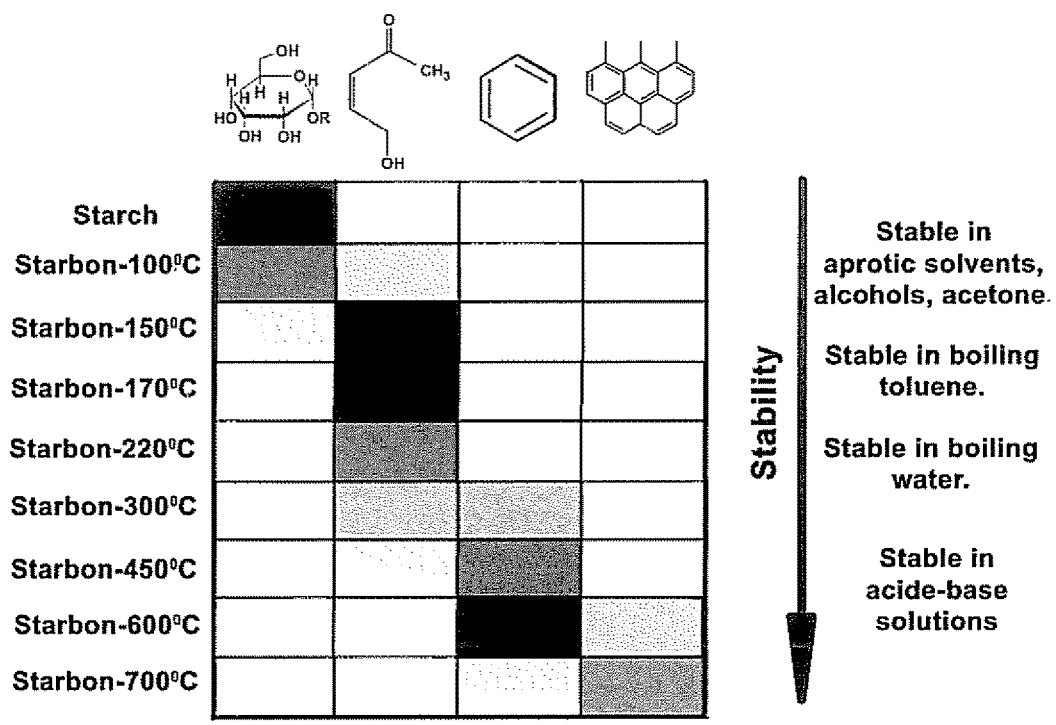
Fig. 6: Chemical structure and stability of underivatised Starbon materials prepared at different temperatures.
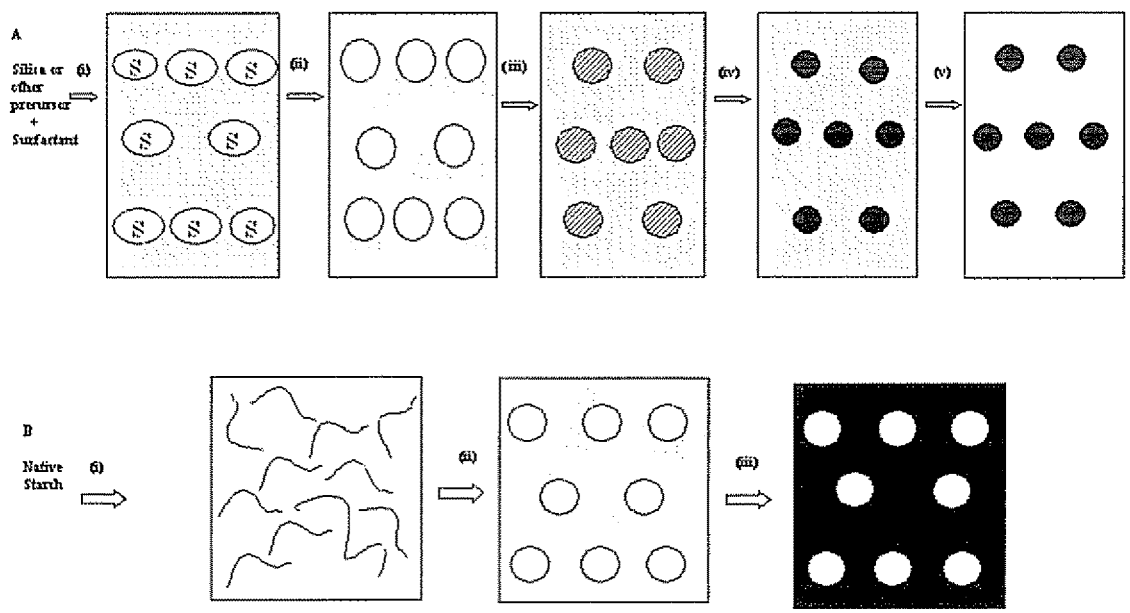
Fig. 7: Schematic illustration of the synthesis routes for mesoporous carbons

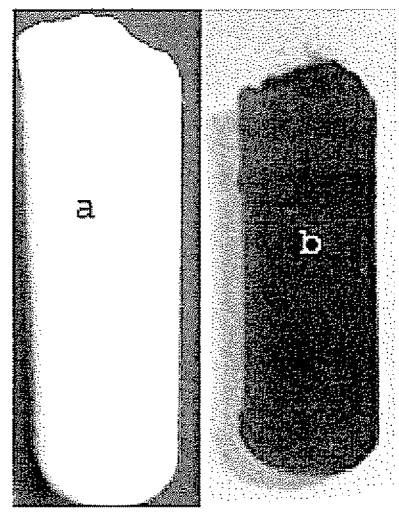
Fig. 8: Photographic images of expanded starch and Starbon monoliths
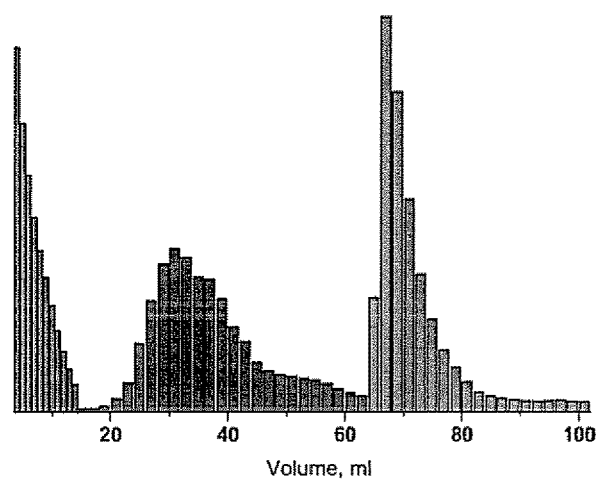
Fig. 9: Separation profiles of ferrocene, acetylferrocene and diacetylferrocene over Starbon-220

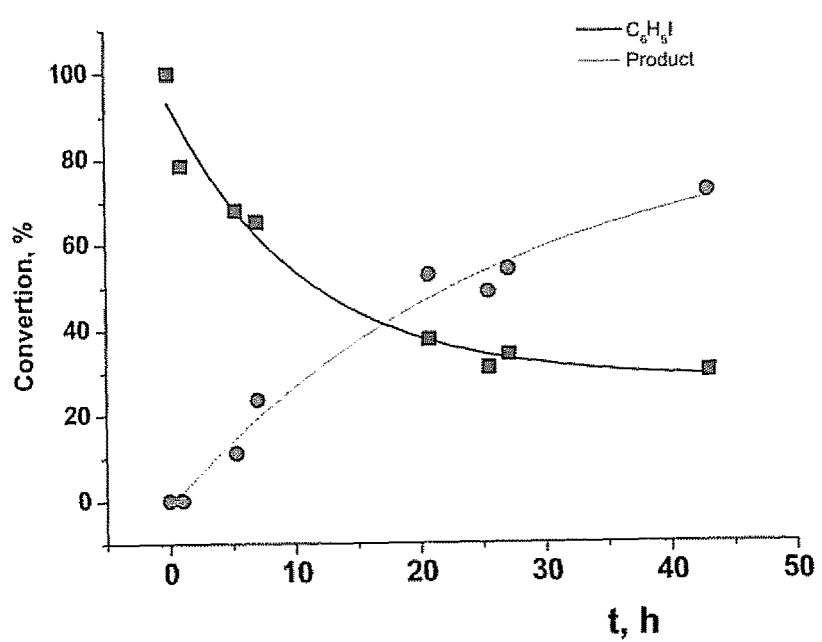
Fig. 10: Kinetic data of Heck reaction in the presence of Pd supported on Starbon-220

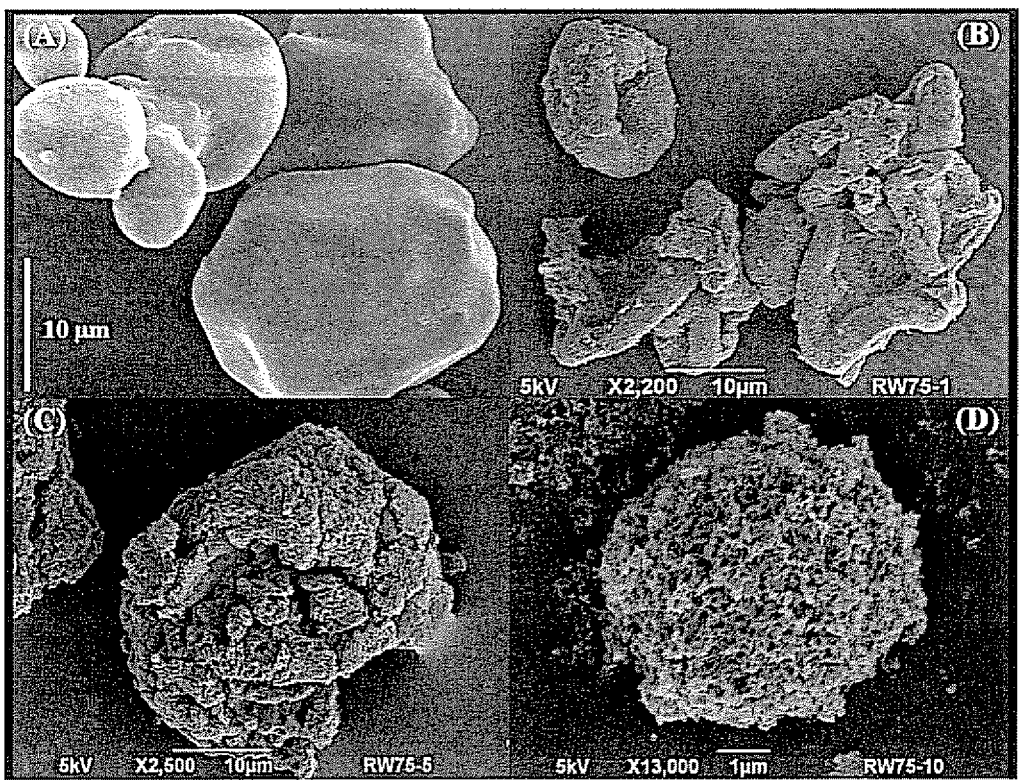
Fig. 11: SEM Analysis of Transition in particle morphology as function of microwave processing temperature., (B) 100°C, (C) 140°C & (D) 180°C, compared to the Native High Amylose Corn Starch Granule (A)
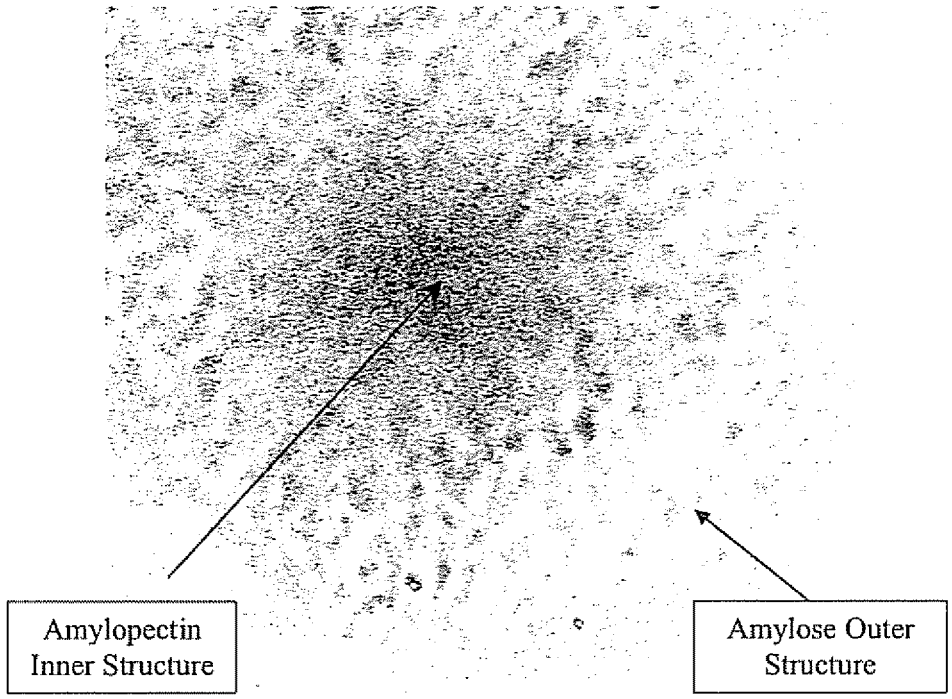
Fig 12: Transmission Electron Microscopy (TEM) Analysis of Expanded Starch Particles

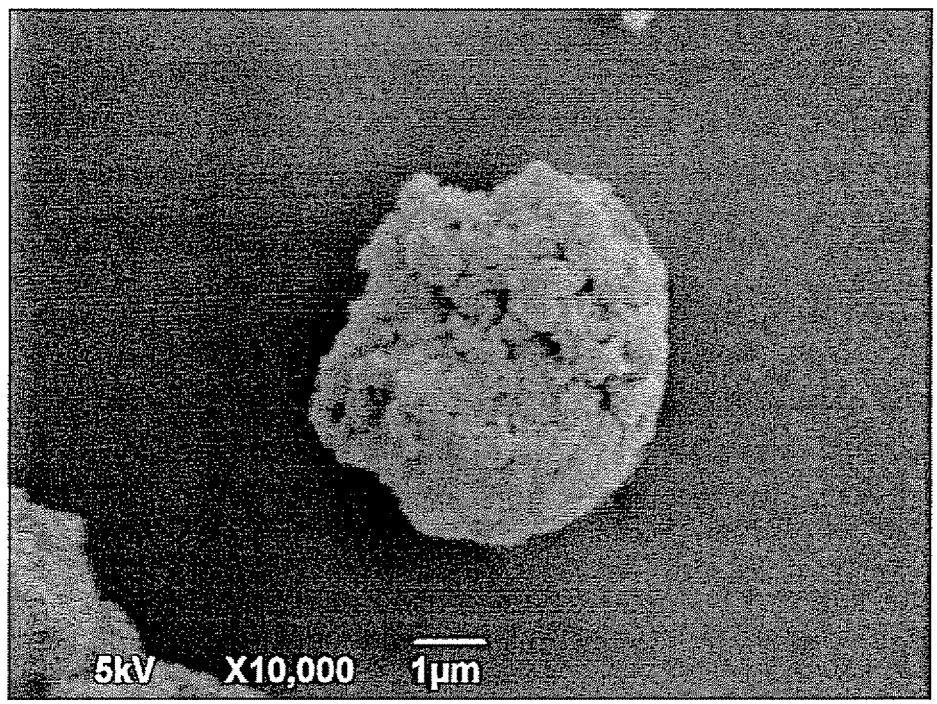
Fig. 13: SEM Analysis of Starbon- 700°C Carbonised Expanded Starch Particles
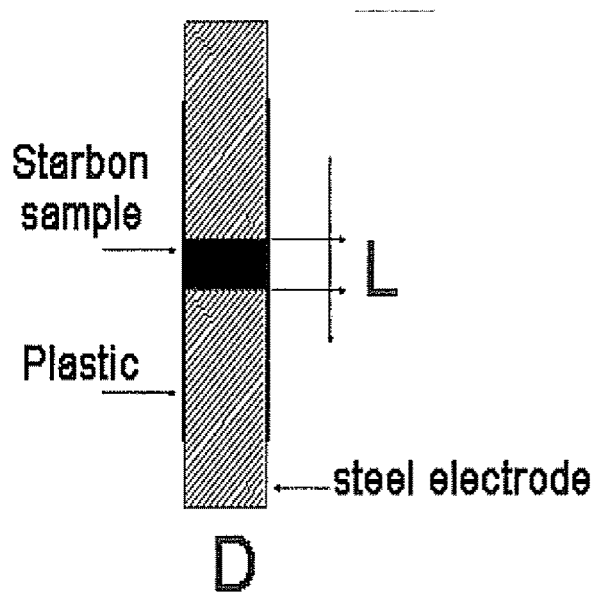
Fig. 14: Schematic of the apparatus used to measure Starbon conductivity.

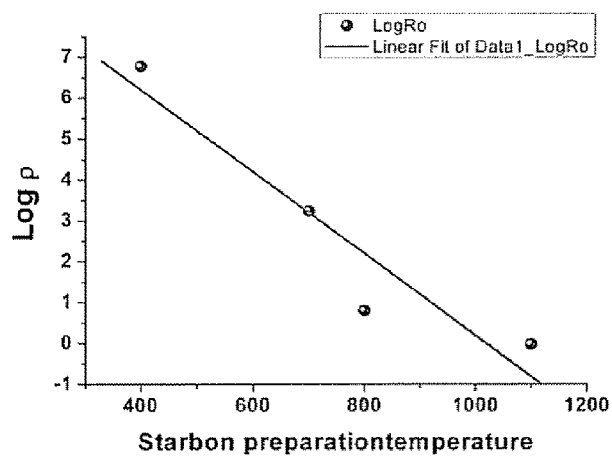
Fig. 15: Log of specific electrical resistance as a function of Starbon preparation temperature.
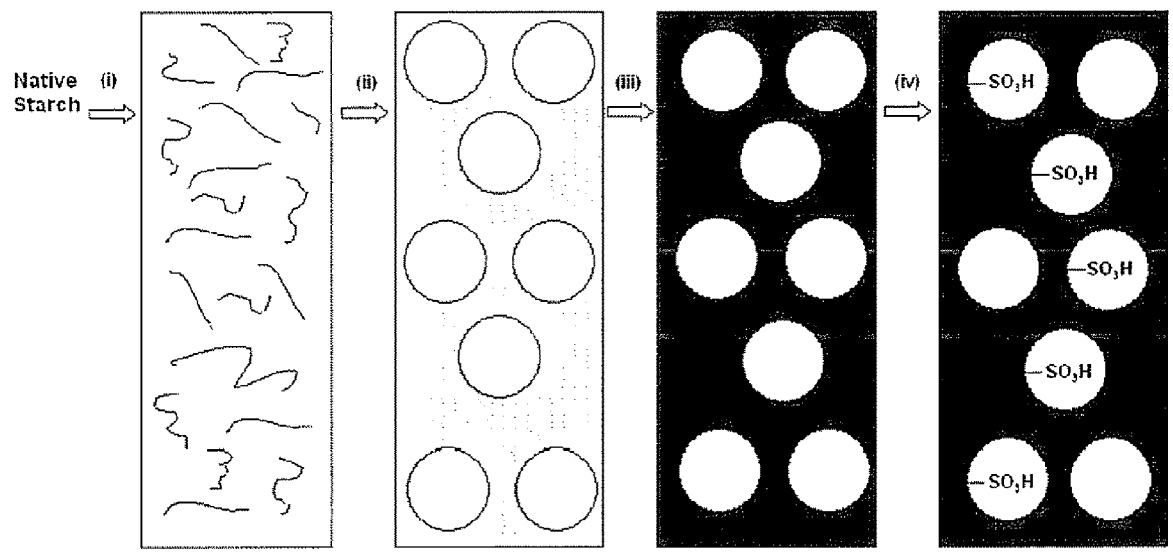
Fig. 16: Schematic of the synthesis route from starch to Starbon acid with gelatinisation (i), retrogradation (ii), controlled corbonisation (iii) and acidification (iv).

Fig. 17: TEM micrographs, showing incorporation of Pd nanoparticles into the Starbon structure.
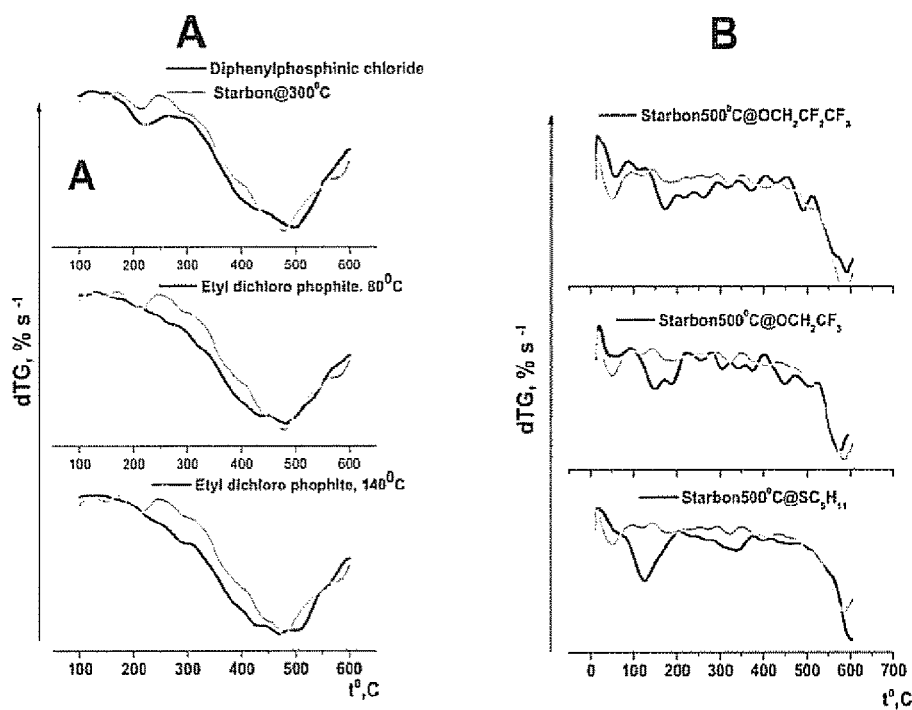
Figure 18: Comparison between dTG profile (sample mass loss with time) of parent Starbons® (prepared at 300 and 500°C; parts A and B correspondently) and Starbons® after Mw-modification.

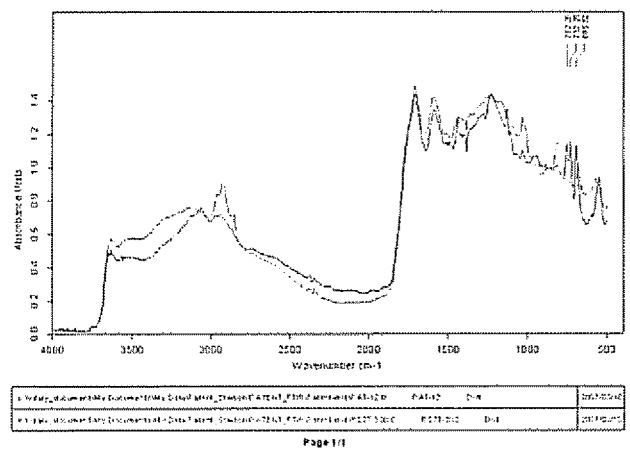
Figure 19: Comparison between Drift FT-IR spectrum of Starbon@500 before (RS7T-300) and after modification with diphenylphosphinic $(C_6H_5)_2P(O)$ functional group (PAT-12).
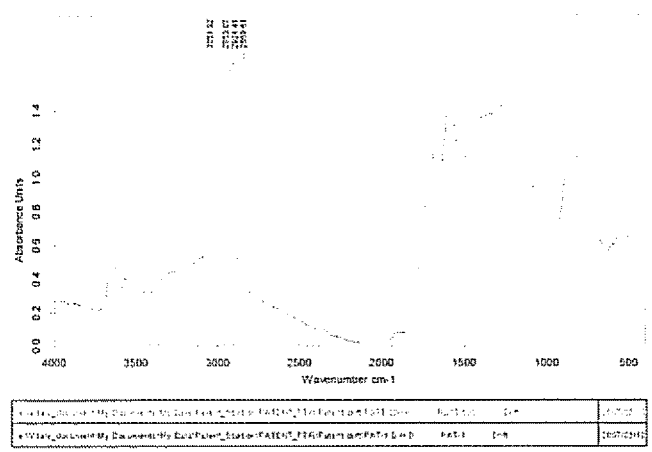
Figure 20: Comparison between DRIFT FT-IR spectrum of Starbon@500 before (RS7T-500) and after modification with $C5H11S$- functional group (PAT-1).

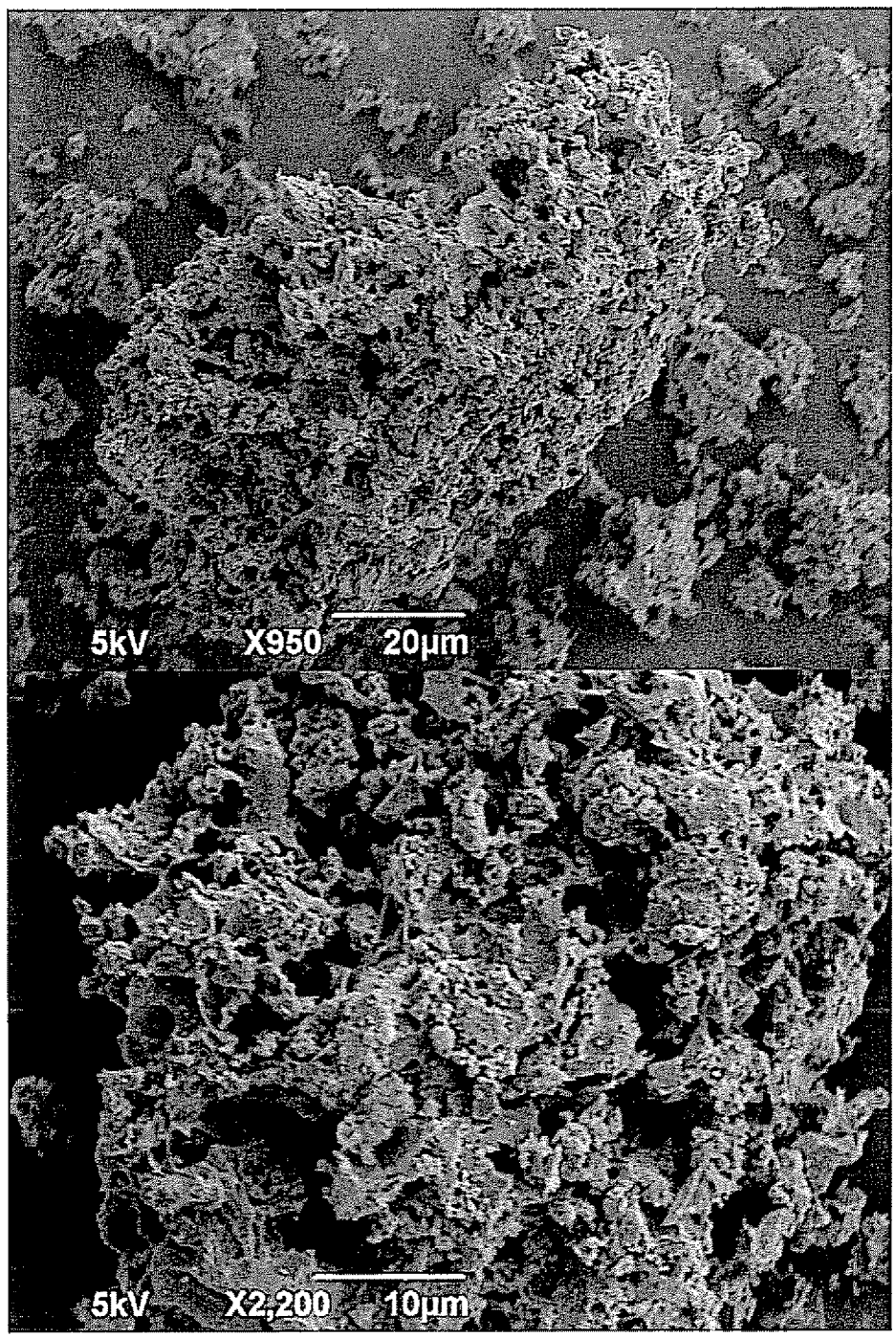
Figure 21: SEM of silica Starbon 700°C composite material at different magnifications

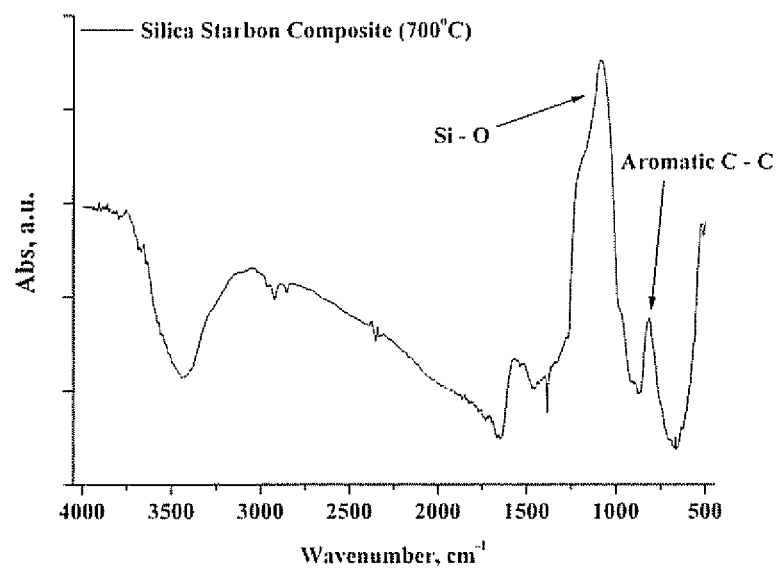
Fig. 22: FT-IR drift analysis

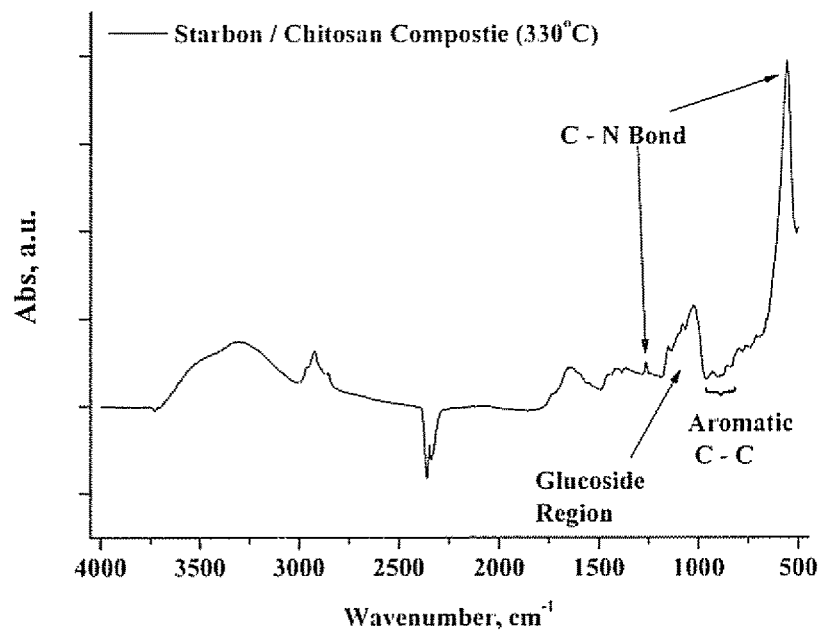
Fig. 23: *FT-IR (DRIFT) Analysis*
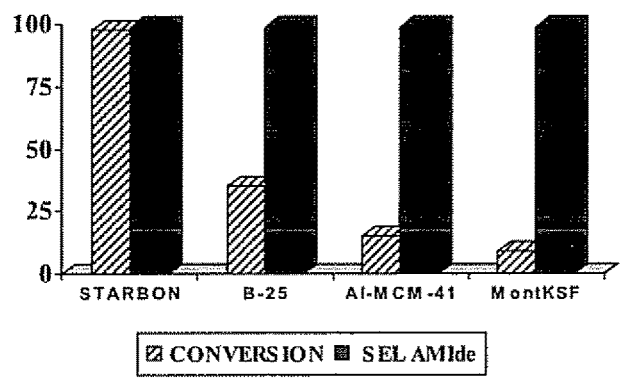
Figure 24: Aniline acylation with acetic acid on different solid acids (2 mmol aniline, 2 mmol HAc, 0.1 g cat., 300 W, 130C, 900 s)

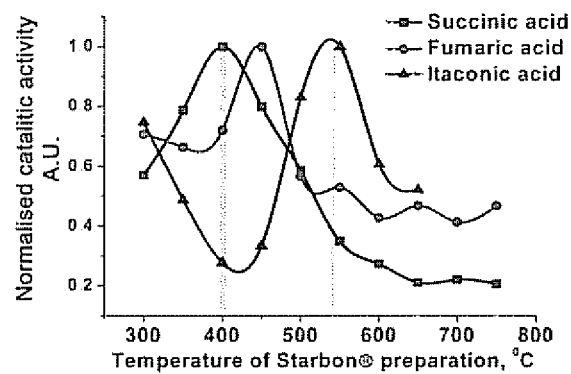
Fig 25: Normalised catalytic activity of Starbon® acids in the esterification of succinic, fumaric and itaconic acids depending of the parent Starbon preparation temperature.

CARBONACEOUS MATERIALS

CROSS REFERENCE TO RELATED APPLICATIONS

This application is the U.S. national phase of International Application No. PCT/EP2007/052482 filed on Mar. 15, 2007 and published in English on Sep. 20, 2007 as International Publication No. WO 2007/104798 A2, which application claims priority to Great Britain Application No. 0605195.7 filed on Mar. 15, 2006, and Great Britain Application No. 0608438.8 filed on Apr. 28, 2006, the contents of all of which are incorporated herein by reference.

The present disclosure relates to a new family of carbonaceous materials derived from high surface area polysaccharides called which the inventors have called "Starbons". For ease of reference, the term "Starbons" will be used throughout this specification to refer to these new materials. The present disclosure also relates to methods of preparation of the Starbons, to functionalised Starbons and Starbon derivatives, to the preparation of functionalised Starbons and derivatised Starbons and to the use of Starbons for the catalysis, promotion or mediation of chemical reactions, such as chemical synthesis reactions.

BACKGROUND

Almost 1 MT/y of activated carbons are used in a very wide variety of applications[1]. The largest volume use of activated carbons is in water treatment with other important applications including gas purification, decolourisation and adsorbency. More speciality, small volume, uses include catalysis, electrochemistry including fuel cells, biomedical devices, hydrogen storage, personal protection and automotive components. Activated carbons are used in different physical forms including powders, beads, cloths and monoliths.

Most activated carbons are made from highly abundant, low cost and essentially sustainable raw materials including coconut, coal, lignite, wood and fruitstones. The problems and limitations with such carbons include high levels of impurities, variable pore structures and limited physical forms in which they can be made stable. In particular, it would be desirable to make activated carbons with high mesoporosity[2-8] for liquid phase and biomedical applications, and to make such activated carbons which can be shaped into stable forms including monoliths for good control of pressure drop and good heat and mass transfer characteristics. Such materials can be used in more specialised applications and attract higher prices.

Solid acids are very important catalysts in the petroleum refinery and in the production of chemicals. At least 180 industrial processes using solid acids are in operation although many others still use conventional liquid and soluble acids that generally lead to health and safety, corrosion and separation problems. Solid acids are normally considered to be easier and safer to use, easier to separate and recover for reuse and lead to less process waste. They can also give more selective reactions due to pore constraints or other surface effects. A difficulty in the use of solid acids is that they become severely poisoned by water so that they are normally made anhydrous before use. Clearly the use of conventional solid acids in water as a solvent or co-solvent is normally not effective. However water stable or water tolerant solid acids would have great advantages in many cases, including the catalysis of reactions of water-soluble substrates, the catalysis of reactions of compounds derived from aqueous fermentation processes and generally in the avoidance of organic solvents in chemical processes. Great efforts have been made to develop water-tolerant solid acid catalysts but only with limited success, for example with some hydrophobic zeolites[1]. There is a great need to develop new water-tolerant but also active solid acid catalysts.

Similarly there is a need to develop new solid supported catalyst materials other than acid catalysts, such as basic materials or supported metals.

Conventionally, most activated carbons are made from highly abundant, low cost and essentially sustainable raw materials including coconut, coal, lignite, wood and fruitstones. The problems and limitations with such carbons include high levels of impurities, variable pore structures and limited physical forms in which they can be made stable. In particular, it would be desirable to make activated carbons with added functionality, such as including carbon acids, with high mesoporosity[2-8] for example for liquid phase catalytic applications. It would also be desirable to be able to shape such materials into stable forms for good heat and mass transfer characteristics.

One known approach to the preparation of more mesoporous and shaped activated carbons is through the use of synthetic organic polymer precursors. However, these are not sustainable materials being largely derived from petroleum-sourced polymers.

Another approach, which is illustrated schematically in FIG. 1, for the preparation of mesoporous carbons is through the use of mesoporous inorganic solid templates[8] (steps (i) and (ii)). By adsorption of a source of carbon such as sucrose into the pores (step (iii)) followed by decomposition of the carbon source (step (iv)) and dissolution of the inorganic template (step (v)), a mesoporous carbon can be formed. However, the method is multi-step, energy-intensive, and wasteful.

Another approach to the preparation of mesoporous carbons is through metal carbide precursors, for example zirconium carbide. However, these require the preparation of the precursors, can be expensive and only in some cases give a mesoporous structure.

Starch and cellulose are biopolymers produced by plants. They are non-toxic, naturally abundant and biodegradable and as such represent a vital renewable resource for sustainable development. Like all organic materials, they can be carbonised, typically by heating to high (>300° C.) temperatures in air. The carbons produced in this way from ordinary native (i.e. non-modified) cellulose and starches are normally of limited value due to high microporosity and very little control is possible in the preparation over the bulk or surface structure. There is a need to develop new, simpler and less wasteful routes to mesoporous carbons and a need to design new forms of carbon especially with controlled bulk and surface structures, functionalisation (such as acidity) or derivatisation (such as metal adsorption) and activity in aqueous environments.

The terms "mesoporous", "mesoporosity", "microporous" and "microporosity are used herein in accordance with IUPAC (International Union of Pure and Applied Chemistry) standards. Mesoporosity includes pore size distributions typically between 2 to 50 nm (20 to 500 Å) whereas materials with pore sizes typically smaller than 2 nm (20 Å) are considered as microporous.

BRIEF SUMMARY OF THE DISCLOSURE

The present disclosure relates to a new class of mesoporous solids comprising or derived from novel carbonaceous materials which the inventors have termed "Starbons", and to functionalised and derivatised Starbons, to methods of their production and to uses thereof.

According to a first aspect of the present invention there is provided a polysaccharide-derived carbonaceous material having mesoporosity.

In preferred embodiments of this aspect of the disclosure the carbonaceous material is derived from a starch or a combination of starches. In particularly preferred embodiment the carbonaceous material is derived from an expanded (high surface area) starch, and more especially a retrograded starch.

Preferably the carbonaceous material is derived from the polysaccharide by carbonisation at a temperature of at least about 100° C.

In another preferred embodiment the carbonaceous material is derived from the polysaccharide by carbonisation at a temperature in the range of from about 100° C. to about 1200° C.

In a further preferred embodiment, the carbonaceous material is derived from the polysaccharide by carbonisation at a temperature in the range of from about 100° C. to about 700° C.

In another preferred embodiment the carbonaceous material is derived from the polysaccharide by carbonisation at a temperature in the range of from about 100° C. to about 170° C. Within this range the carbonaceous material retains chemical structural characteristics of the parent polysaccharide to the maximum extent.

In another preferred embodiment the carbonaceous material is derived from the polysaccharide by carbonisation at a temperature in the range of from about 100° C. to about 450° C. At temperatures within this range, the carbonaceous material begins to develop aromatic character.

In a further preferred embodiment carbonaceous material is derived from the polysaccharide by carbonisation at a temperature in the range of from about 150° C. to about 220° C. Within this temperature range, significant elements of the structure of the originating polysaccharide are retained.

In a still further preferred embodiment the carbonaceous material is derived from the polysaccharide by carbonisation at a temperature in the range of from about 300° C. to about 700° C. At temperatures within this range, aromatic character is further developed, and significant mesoporosity remains.

In a yet further preferred embodiment the carbonaceous material is derived from the polysaccharide by carbonisation at a temperature of about 600° C. or more.

According to a second aspect of the invention there is provided carbonaceous material obtained or obtainable by carbonisation of a polysaccharide.

In particularly preferred embodiments according to this second aspect of the disclosure, the material has mesoporosity.

Most preferably the polysaccharide is a starch or a combination of starches.

Preferably the polysaccharide is an expanded (high surface area) starch and in particular a retrograded starch.

Preferably in this second aspect of the disclosure the polysaccharide is carbonised at a temperature of at least about 100° C.

In another preferred embodiment the polysaccharide is carbonised at a temperature in the range of from about 100° C. to about 1200° C.

In a further preferred embodiment of this second aspect the polysaccharide is carbonised at a temperature in the range of from about 100° C. to about 700° C.

In a yet further preferred embodiment the polysaccharide is carbonised at a temperature in the range of from about 100° C. to about 170° C. Within this range the carbonaceous material retains chemical structural characteristics of the parent polysaccharide to the maximum extent.

In a still further preferred embodiment of the second aspect of the disclosure the polysaccharide is carbonised at a temperature in the range of from about 100° C. to about 450° C. At temperatures within this range, the carbonaceous material begins to develop aromatic character.

In a yet further embodiment the polysaccharide is carbonised at a temperature in the range of from about 150° C. to about 220° C. Within this temperature range, significant elements of the structure of the originating polysaccharide are retained.

In further preferred embodiments the polysaccharide is carbonised at a temperature in the range of from about 300° C. to about 700° C. At temperatures within this range, aromatic character is further developed, and significant mesoporosity remains.

In other preferred embodiments the polysaccharide is carbonised at a temperature of about 600° C. or more.

In some preferred embodiments according to the first or second aspects the carbonaceous material is stable in aprotic solvents, alcohol or acetone.

In further preferred embodiments of the first and second aspects, the carbonaceous material is stable in boiling toluene.

In yet further preferred embodiments of the first and second aspects, the carbonaceous material is stable in boiling water.

In yet further preferred embodiments the material is stable in acid and base solutions. Preferably the carbonaceous material is at least partially electrically conductive. More particularly the material preferably has a specific resistance of not more than 1 $\Omega m^{-1}$, more preferably of not more than 1 $\Omega m^{-1}$ and especially of not more than 0.1 $\Omega m^{-1}$.

In much preferred embodiments the material retains at least some chemical structural elements of the polysaccharide from which it is derived.

Preferably the material retains polysaccharide-derived oxygen-containing functions. For example the material may retain polysaccharide-derived hydroxyl functions.

In further preferred embodiments the material has at least some aromatic character.

Most preferably the material retains a pore structure similar to that of the polysaccharide from which it is derived and preferably the degree of microporosity is not more than the degree of mesoporosity.

In still further preferred embodiments of the first and second aspects the material has a surface energy in the range of from about 5 to 25 kJmol$^{-1}$, preferably 10 to 25 kJmol$^{1}$ and more preferably 15 to 25 kJmol$^{-1}$.

In particularly preferred embodiments the material is chemically functionalised or derivatised.

Preferably in these embodiments the carbonaceous material includes chemically bound functional moieties and/or functional moieties immobilised within the material.

In some preferred embodiments the functional moiety is a catalytically active moiety.

The functional moiety may preferably be selected from the group comprising Brönsted acids, Lewis acids, bases, metals and metal containing moieties. Examples of Brönsted acids include mineral acids such as sulphuric acid and organic acids such as carboxylic acids. Lewis acids may include $BF_3$, $ZnCl_2$ and the like.

In further preferred embodiments the moiety includes one or more hetero-atoms. The hetero-atoms may, for example, be selected from the group comprising B, P, S, halogen, N and Si.

According to a third aspect of the disclosure there is provided method of preparing a mesoporous carbonaceous material which method comprises carbonisation of a polysaccharide material.

Preferably in this third aspect the carbonisation step is carried out at a temperature of at least about 100° C.

In particularly preferred embodiments of this third aspect the polysaccharide is a starch or a combination of starches, in particular an expanded (high surface area) starch and especially a retrograded starch.

In preferred embodiments the carbonisation step is carried out at a temperature in the range of from about 100° C. to about 1200° C.

In further preferred embodiments the carbonisation step is carried out at a temperature in the range of from about 100° C. to about 700° C.

In other preferred embodiments the carbonisation step is carried out at a temperature in the range of from about 100° C. to about 170° C. Within this range the carbonaceous material retains chemical structural characteristics of the parent polysaccharide to the maximum extent.

In still further preferred embodiments the carbonisation step is carried out at a temperature in the range of from about 100° C. to about 450° C. At temperatures within this range, the carbonaceous material begins to develop aromatic character.

In still further preferred embodiments the carbonisation step is carried out at a temperature in the range of from about 150° C. to about 220° C. Within this temperature range, significant elements of the structure of the originating polysaccharide are retained.

In yet further preferred embodiments the carbonisation step is carried out at a temperature in the range of from about 300° C. to about 700° C. At temperatures within this range, aromatic character is further developed, and significant mesoporosity remains.

In other preferred embodiments the carbonisation step is carried out at a temperature of about 600° C. or more.

In particularly preferred embodiments of the third aspect the material retains chemical structural elements of the polysaccharide from which it is derived.

In this respect, preferably the material retains polysaccharide-derived oxygen-containing functions. For example, the material may retain polysaccharide-derived hydroxyl functions.

In other preferred embodiments of this third aspect the material has at least some aromatic character.

In further preferred embodiments the material retains a pore structure similar to that of the polysaccharide from which it is derived.

In particularly preferred embodiments the method further comprises a step of functionalising or derivatising the carbonaceous material.

Preferably the functionalisation or derivatising step includes chemically binding functional moieties and/or immobilising functional moieties within the material.

For example, the functional moiety may be a catalytically active moiety.

The functional moiety may, for example be selected from the group comprising Brönsted acids, Lewis acids, bases, metals and metal containing moieties.

In further embodiments the moiety includes one or more hetero-atoms such as, for example, those selected from the group comprising B, P, S, halogen, N and Si.

According to a fourth aspect of the disclosure there is provided a carbonaceous material when obtained or when obtainable by the method of the third aspect of the disclosure.

According to a fifth aspect of the disclosure there is provided the use of a carbonaceous material as defined in any of first second or fourth aspects as a solid support for a catalyst or promoter in fluid phase chemical reaction.

Preferably in this fifth aspect the chemical reaction is an aqueous phase chemical reaction.

According to a sixth aspect of the disclosure there is provided a solid support for a catalyst or promoter, for use in a fluid phase chemical reaction wherein said solid support comprises a carbonaceous material as defined in the first or second aspects of the disclosure.

According to a seventh aspect of the disclosure there is provided a solid phase for use in chromatographic separations comprising a carbonaceous material as defined in the first or second aspect.

According to an eighth aspect of the disclosure there is provided a chromatography separation method using a solid phase as defined in the seventh aspect.

For a better understanding of the invention and to show how the same may be carried into effect, reference will be made, by way of example only, to the following Figures, in which:

FIG. 1 is diagram indicating stages in converting starch into Starbon;

FIG. 2 illustrates the effect of heating on the porous structure of expanded starch;

FIG. 3 shows a simultaneous thermogravimetric analysis of Starbons;

FIG. 4 contains infra-red spectra of expanded starch and Starbon materials;

FIG. 5 is a $^{13}C$ MAS NMR of Starbons;

FIG. 6 is a diagram indicating chemical structures present in Starbons carbonised at a range of temperatures;

FIG. 7A shows a prior art synthesis route;

FIG. 7B illustrates schematically a synthesis route according to the present disclosure;

FIG. 8 contains images of expanded starch and a Starbon monolith;

FIG. 9 represents chromatographic profiles (left to right) of ferrocene, acetylferrocence, and diacetylferrocene over Starbon-220;

FIG. 10 shows kinetic data of a Heck reaction in the presence of a Pd-supported on Starbon 220;

FIG. 11 shows an SEM analysis of particle morphology as a function of processing temperature;

FIG. 12 shows a TEM image of expanded starch particles;

FIG. 13 shows an SEM image of Starbon 700° C.;

FIG. 14 is a schematic illustration of an apparatus for measuring conductivity;

FIG. 15 shows log (rho) as a function of Starbon preparation temperature;

FIG. 16 is a schematic illustration of the synthesis route from starch to Starbon-acid;

FIG. 17 shows TEM micrographs of Pd-nanoparticles in Starbons;

FIG. 18 shows a comparison between dTG profile of parent Starbons and Starbons after functionalisation;

FIG. 19 shows a comparison between the DRIFT FT-IR spectra of Starbon 500 before and after functionalisation with a diphenylphosphine moiety;

FIG. 20 shows a comparison between the DRIFT FT-IR spectra of Starbon 500 before and after functionalisation with a $C_5H_{11}S$ moiety;

FIG. 21 shows SEM micrographs of silica-Starbon composite material;

FIG. 22 shows an FT-IR DRIFT analysis of silica-Starbon composite;

FIG. 23 shows an FT-IR DRIFT of chitosan-Starbon composite;

FIG. 24 shows a comparison of aniline acetylation with Starbon and convention solid acids; and FIG. 25 shows normalised catalytic activity as a function of temperature of Starbon preparation for three different substrates.

In preferred forms, the Starbons are produced from high surface area forms of starch and other expanded polysaccharides[9-11] and are typically characterised by having high degrees of mesoporosity and by having surface structures which are, to varying degrees, a mixture of starch-like and carbon-like, the relative proportion being determined by, for example, the carbonisation temperature (100-700+° C. or more). This relative proportion is usable to influence subsequent functionalisation or derivatisation and subsequent use in different applications. To convert the Starbons to, for example, solid acids ("Starbon acids"), the Starbons can be reacted with sulfuric acid so as to form sulfuric acid functions on the surface of the Starbon acids. Alternatively, to prepare a carboxylic acid functionalised Starbon, a cyano group containing moiety may be grafted to the Starbon and subsequently hydrolysed to give the carboxylic acid. The Starbon acids can be produced in different forms such as powders and pellets extending the range of applications. These materials are stable to water including hot water; they can be used as catalysts in aqueous media including the catalysis of reactions of compounds dissolved in water. The Starbon acids are useful catalysts for the reactions of compounds in aqueous solutions obtained from the fermentation of biomass.

In a favoured embodiment, the polysaccharide precursor material is a starch. High surface area forms of the polysaccharide are very desirable to make the Starbons and high surface area starches have been found to be more stable upon storage for extended periods than other high surface area polysaccharides, e.g. cellulose.

Preferably, the starch is a retrograded starch. Preferably the starch has an amylose content of at least 20%, more preferably at least 30% and most preferably at least 60% by weight. It has been found that higher amylose starches generally give higher surface area materials after treatment than lower amylose starches and retrograde more rapidly. Examples of suitable starches include corn starches, potato starches, wheat starches, and rice starches.

Suitable methods for preparing high surface area starches for use in the preparation of Starbon carbonaceous materials of the present disclosure are described, for example, in WO2005/011836 and U.S. Pat. No. 5,958,589 the disclosures of which are hereby incorporated by reference. In general terms, one such method involves the steps of (i) gelatinising the starch in the presence of water to give a starch/water gel, (ii) allowing the starch to retrograde and (iii) exchanging the water in the retrograded starch gel with a water miscible non-solvent for starch which has a lower surface tension than water. Suitable non-solvents include ethanol. The method can involve a series of solvents to remove the water and can involve final drying of the high surface area starch by evaporation, or can involve the use of supercritical drying including the use of liquid or supercritical carbon dioxide. The high surface area starch can be stored as a solid material or kept as a slurry in a non-solvent.

The high surface area (expanded) starch can be converted directly into a Starbon by heating. The heating may be carried out at any temperature or other conditions at which suitable carbonisation occurs. Suitable conditions may include vacuum conditions. These conditions may in some embodiments include the use of microwave heating. The conditions may also involve use of a catalyst (such an acid catalyst) which promotes the desired carbonisation. The amount of acid catalyst and its identity may be varied in order to vary the subsequent processing and material properties. One suitable method for preparing Starbons is to stir the expanded starch (prepared as described above) with 5% by weight of p-tolulene sulfonic in acetone, then to remove the acetone by evaporation. The acid-treated starch is then heated to about 100° C. or higher in a vacuum. At about 100° C. carbonisation becomes evident from the blackening of the starch material. The Starbons are formed at temperatures typically of from 100° C. to 300° C. or more, for example up to 700° C. or more. Formation of carbonaceous materials from materials such as starch at temperatures close to 100° C. is unusual and offers advantages in terms of the energy which is required and the properties that can be achieved. Materials formed at these different temperatures have different compositions and different properties, and in particular different surface properties. At lower temperatures (less than about 300° C.) the Starbons have pore structures similar to the parent expanded starch. This enables the production of carbonaceous materials with an unusually low degree of microporosity and an unusually high degree of mesoporosity. These materials also appear to have surface structures similar to the parent starches (as indicated by surface energy measurements). This may be a result of the carbonisation process starting from the inside (core) of the starch particles and moving out. At higher temperatures (above about 300° C.) there is a sharp drop in the measured surface energy towards a material which progressively bears greater similarity to a traditional carbon. These materials show an increasing amount of microporosity also typical of a more traditional carbon, although they also retain an unusual degree of mesoporosity. FIG. 6 is illustrative of the progressive change in structure which occurs with increasing temperature in the carbonisation step. In FIG. 6 the density of shading is indicative of the extent to which moieties of the general types indicated in each column heading are present after the carbonisation step.

The resulting Starbons can be functionalised or derivatised by various means. In some particularly favoured embodiments of the present disclosure the Starbon is converted into a solid acid by reaction with a traditional acid or with an organic acid or precursor thereof. Suitable traditional acids include Brönsted acids, such as sulfuric acid, and carboxylic acids and Lewis acids such aluminium chloride, zinc chloride or $BF_3$. In other embodiments the metals, such as catalytically useful metals may be adsorbed onto or otherwise immobilised in the Starbon. Hetero-atoms may also be incorporated. In further alternative embodiments the Starbon may be prepared in combination with other starting materials, in particular polymeric materials and especially naturally occurring polymeric materials.

Users may select Starbons prepared at different carbonisation temperatures for different uses since, as noted above, different carbonisation temperatures result in different surface structures, which may, in turn, react or combine (e.g. adsorb or immobilise) to different extents with functionalising agents (such as the traditional acids) or derivatising agents thereby to provide different properties in use, for example as catalysts.

In some preferred embodiments for preparing a solid acid the traditional acid is sulfuric acid, which may be used as the pure acid or as a concentrated solution in water. By stirring the Starbon with a concentrated solution of sulfuric acid between 20 and 100° C., sulfonic acid sites are formed on the Starbon surface. One suitable form of Starbon for modification with sulfuric acid is a Starbon prepared at temperatures high enough to have developed aromatic character but not high enough to have removed most of the polysaccharide-derived oxygen-containing functions, typically hydroxyl functions. Similar considerations apply to functionalisation with other Brönsted acids such as carboxylic acids. Thus in preferred embodiments Starbons prepared at about 200° C. to about 600° C. can be reacted with, for example, sulfuric acid or a carboxylic acid (or precursor thereof) to produce a solid acid that has both a good level of sulfonic or carboxylic acid functionality and also good surface polarity to assist the reactions of polar molecules, and which moreover is water-stable. This water stability makes the acid-functionalised Starbon suitable for catalysing the reactions of organic compounds, such as biomass-derived carboxylic acids, in water. The Starbon acids prepared in this way are mesoporous and maintain a high surface area (typically greater than about 100 $m^2g^{-1}$).

Starbons with basic functionality may be prepared by analogous methods and are useful in, for example, base catalysed condensation reactions.

An overall method of preparing mesoporous functionalised Starbons (using, as an example, treatment with sulfuric acid to obtain a solid sulfonic acid) is illustrated in (FIG. 16). Referring to FIG. 16, in stage (i) the native starch is gelatinised. In stage (ii) the gelatinised starch is allowed to retrograde. Stage (iii) comprises carbonisation under selected and controlled conditions as outlined above and in stage (iv) the Starbon is treated with a functionalising agent, in this case sulfuric acid.

The process of preparation of the Starbons can be made more specific or localised. In an example, micro regions including micro-channels of carbon are created in a starch matrix, for example a plate, by placing micro spots of acid catalyst onto the expanded starch and then carbonising at those points, for example by microwave activation. Additionally, locally functionalised or derivatised Starbons can be obtained by adding suitable functionalising or derivatising moieties at the locally carbonised locations. In an example, acid species, for example sulfuric acid, are added at the locally carbonised regions so as to produce micro-channel Starbon acids for catalytic applications. In this way an array of micro-channels can be produced in a "black and white" contrast fashion, suitable for rapid screening and combinatorial-type studies.

The progress of the process of thermal carbonisation of a mesoporous polysaccharide material (especially a mesoporous starch) for the preparation of a Starbon, functionalised Starbon or derivatised Starbon can be followed by techniques including thermogravimetric analysis and by $^{13}C$ magic angle spinning NMR spectroscopy. Porosimetry and surface areas can be measured, for example using automated BET measuring devices based, for example, on nitrogen adsorption. Techniques such as electron microscopy and spectroscopic probing can be used to study the surface structure, energy and chemistry.

The Starbons can be used in a number of applications where carbons, mesoporous materials and mesoporous carbons in particular find use. These applications include among others, separation, trapping, catalysis, storage and in composites. For example, the Starbons can be used as stationary phases for example in liquid chromatography including high pressure liquid chromatography (HPLC). In this way, mixtures including complex mixtures can be separated on a Starbon material using solvent mobile phases. Such mixtures may include mixtures of organic compounds, including for example pharmaceutically useful compounds and mixtures derived from natural product extracts including waxes, mixtures of organometallic compounds, and mixtures of inorganic compounds. The variable or selectable surface energy of the Starbons is of particular value in separations since surface energies control the retention of eluting compounds or complexes. Thus, mixtures of compounds with different polarities can be separated using different Starbons, and solvents of different polarities can be used to elute different compounds from the Starbon stationary phase. This includes the use of less polar solvents and the use of lower volumes of solvent than might normally be required, when using traditional silica stationary phases.

Starbons can also be used in catalysis, including their use as catalyst supports. For example, precious metals or metal complexes can be immobilised on the Starbons and the resulting supported metals can be used as catalysts in gas and liquid phase reactions including those of organic molecules. In this way, Starbon-based catalysts can be used in important reactions including hydrogenations, dehydrogenations, Heck and Suzuki and other carbon-carbon bond forming reactions, and oxidation. The mesoporosity of the Starbons make them especially useful for liquid phase reactions such as those including reactions of large molecules. The variable or selectable surface structure of the Starbons is useful, for example to assist metal binding and to effect molecular diffusion.

More particularly, the acid functionalised Starbons can be used as catalysts including the catalysis of reactions of organic compounds. Reactions can include the aqueous reactions of water-soluble organic compounds as well as other reactions under aqueous or partially aqueous conditions. This takes advantage of the stability of the Starbon towards water including hot water, coupled with the presence of polar and other groups on the Starbon acids especially on those Starbons prepared in the temperature range of about 200° C. to about. 600° C. The mesoporosity of the Starbon acids also enables the diffusion of molecules, including quite large molecules, at useful rates: This diffusion does not have a large detrimental effect on the rates of reactions catalysed by Starbon acids. Reaction types that the Starbon acids can catalyse include esterifications, isomerisations, dehydrations, cyclisations, alkylations and acylations.

Examples of reactions of importance that the functionalised Starbons (in particular Starbon acids) can catalyse include the reactions of so called biomass platform molecules. These are compounds obtained from the fermentation or other cracking process on biomass. Biomass is renewable biological material including tree materials, plants, grasses, agricultural residues and by-products and food residues and by-products. Fermentation processes on biomass normally produce aqueous mixtures of compounds. These compounds include those identified as platform molecules which can be produced in very large quantities, and which can be converted into many other useful compounds. Platform molecules of interest include succinic acid, glycerol, lactic acid, fumaric acid, levulinic acid, glutamic acid, malic acid, 3-hydroxypropionic acid, 2,5-furan dicarboxylic acid, glucaric acid, itaconic acid, sorbitol and xylitol[12]. These molecules can be converted into other molecules including marketable products and intermediates, through the use of acid-catalysis, for example. These functionalised Starbons (in particular Starbon acids) can be used to convert compounds derived directly from biomass into numerous valuable compounds including esters, dicarboxylic acid monoesters, dicarboxylic acid esters, anhydrides, lactones, amides, dicarboxylic acid monoamides, dicarboxylic acid diamides, cyclic ethers, as well as oligomeric and polymeric substances.

The following non-limiting Examples are illustrative of the invention.

EXAMPLE 1

A Method for Preparation of Starbons

The overall procedure followed to convert starch into Starbon is summarised in FIG. 1. The various procedures involved in the main steps of expansion, solvent exchange and drying, and finally pyrolysis are detailed below in parts 1, 2 and 3 respectively.

Part 1—Preparation of Expanded Starch
Expanded Starch was Prepared Either by Thermal Expansion (a) or Microwave Preparation (b)

(a) Thermal Preparation of Expanded Starch 100 g of High Amylose Corn Starch and 2 L of deionised water was stirred at 700 rpm for ten minutes in a modified household pressure cooker prior to heating (Volume=3 L; Operating conditions 120° C./80 KPa). The lid component of the device was modified with an aluminium enclosure facilitating insertion of a thermocouple. The system was heated to 120° C. (30 minutes) and held at this temperature for a further forty five minutes. Upon returning to atmospheric pressure, the lid was detached, and the resulting solution decanted into powder drying jars. The vessels were then sealed and the gels retrograded at 5° C.

(b) Microwave Assisted Preparation of Expanded Starch 0.25 g of High Amylose Corn Starch was mixed with 7.5 ml of distilled water in a commercial microwave reactor vessel and placed in the reactor and the pressure sensor attached. The sample was then heated to the desired temperature (i.e. 90° C.-180° C.) over 150 seconds in a CEM Discover microwave reactor with computer controlled operation. Upon returning to atmospheric pressure, the vessel remained sealed and was placed in a refrigerator and left to retrograde at 5° C. for a desired time. The resulting gel was then solvent exchanged and dried.

Part 2—Solvent Exchange

Water was removed from the starch aquagel via a solvent exchange procedure. An initial volume of ethanol (10% v/v with water) was added and stirred for 2 hours. A second volume of ethanol (20% v/v) was then added followed by 2 hours stirring. This was followed by a further addition of ethanol (30% v/v) and another 2 hours stirring. The resulting suspension was allowed to settle and filtered. The resulting powder was immersed (with stirring) in a volume of ethanol equivalent to the volume of water used in the gelatinisation stage. This was twice repeated. Ethanol was subsequently exchanged with acetone in the same procedure as that for water to ethanol. Filtration followed by rotary evaporation was used to remove the bulk of the remaining acetone. The product was dried over night at 50° C. in a vacuum oven.

Part 3—Conversion of Expanded Starch to Starbon ("Carbonisation")

A solution of para-toluene sulphonic acid in acetone (1 g acid to 1 ml acetone) was added to the solution of expanded starch in acetone. Acetone was removed from the solution in a rotary evaporator at 35° C. The sample was slowly heated (25° C./h) to 450° C. in a Schlenck line under high vacuum. Thereafter the sample was cooled to room temperature under nitrogen. The resulting Starbon was heated under reflux in toluene, acetone (3 times), ethanol (3 times), ethanol-water solution and acetone again. The sample was dried on a Schlenck-line at room temperature. The properties of the resulting material (Starbon-450) are shown in Table 1. The effect of heating on the porous structure of expanded starch is shown in FIG. 2. Results of the TG analysis of the sample are shown in FIG. 3. DRIFT and NMR spectrum of samples are shown in FIGS. 4 and 5 correspondingly.

EXAMPLE 2

Preparation of Starbons at Different Carbonisation Temperatures

The properties of Starbon-100, Starbon-150, Starbon-220, Starbon-300 and Starbon-350 prepared as for example 1, but with conversion of expanded starch to Starbon at carbonisation temperatures of 100° C., 150° C., 220° C., 300° C. and 350° C. respectively, are shown in table 1 and FIGS. 4 and 5. Starbon can also be prepared following the procedure of example 1, but at higher conversion temperatures, for example 600 and 700° C. The chemical structure and stability to solvents of Starbons converted at various temperatures is given in FIG. 6.

TABLE 1

$N_2$ Porosimetry data for starbons

| Temperature[a]/ ° C. | BET Surface Area/$m^2g^{-1}$ | Pore Volume/ $cm^3g^{-1}$ | % Micropores | Surface[c] Energy |
|---|---|---|---|---|
| 20[b] | 184 | 0.52 | 10 | 7.37 |
| 20 | 230 | 0.75 | 1 | 8.18 |
| 100 | 179 | 0.70 | 1 | 6.90 |
| 150 | 172 | 0.66 | 8 | 6.52 |
| 220 | 151 | 0.50 | 12 | 10.50 |
| Monolith-220 | 151 | 0.50 | 12 | 10.50 |
| 300 | 293 | 0.55 | 28 | 17.66 |
| 450 | 475 | 0.54 | 43 | 20.62 |

[a]Temperature at which acid-treated expanded starch is heated
[b]Non-acid treated expanded starch
[c]Dubinin-Radushkevich method

EXAMPLE 3

Starbon Materials from Different Precursor Starches

Starbon materials were prepared following the procedure of example 1 at different carbonisation temperatures (see Table 2) and from a wide range of starch sources, including potato, corn, wheat, combinations of starches and from bread itself, providing materials with high surface areas (typically between 14 to 270 $m^2$ $g^{-1}$) and very interesting textural properties, including high mesoporore volumes (higher than 0.10 $cm^3$ $g^{-1}$) and pore diameters within the mesoporous range. Table 2 summarises the physical properties of the Starbons prepared from these different starting materials.

TABLE 2

| Starbon temperature preparation | Source, type | $S_{BET}$ $m^2g^{-1}$ | Volume ($cm^3$ $g^{-1}$) micropore | Volume ($cm^3$ $g^{-1}$) mesopore | Diameter nm |
|---|---|---|---|---|---|
| 400 | Corn | 271 | 0.06 | 0.42 | 2.8 |
| 220 | Bread | 14 | 0.00 | 0.10 | 20 |
| 400 | Wheat | 208 | 0.05 | 0.39 | 9.3 |

TABLE 2-continued

| Starbon temperature preparation | Source, type | $S_{BET}$ $m^2g^{-1}$ | Volume (cm$^3$ g$^{-1}$) micropore | mesopore | Diameter nm |
|---|---|---|---|---|---|
| 220 | Amylose:amylopectine 50:50% | 114 | 0.00 | 0.63 | 22 |
| 220 | Corn starch:high amylose 10:90% | 32 | 0.00 | 0.19 | 23 |

This data demonstrates that Starbon mesoporous carbonaceous materials can be prepared not only from starch but also from any combination of the individual polysaccharides (amylose and amylopectin mixture) obtained from natural sources (i.e bread, corn, wheat) as well as from synthetic ones (synthetic mixtures of amylose and amylopectin). Mesoporous materials could not be produced from either pure amylose or pure amylopectin separately, indicating that the precursor starch used to generate the Starbons required a mixed amylase and amylopectin character.

EXAMPLE 4

Native normal corn starch was suspended in distilled water (1 g starch: 5 ml water). The mixture was heated under reflux at 125° C. with stirring in a closed jar for 5 hours. The resultant gel was allowed to retrograde for 5 days at 5° C. Starting from this gel, Starbon was prepared as for example 1 parts 2 and 3, but with a temperature of carbonisation of 220° C. The properties of the resulting material are shown in Table 1.

EXAMPLE 5

Preparation of Starbon Monolith

The solution of expanded starch in acetone was prepared as for example 1. The solution was centrifuged at 5000 rpm. The liquid phase was decanted and a saturated solution of para-toluene sulphonic acid (carbonisation catalyst) in acetone (2 g) was added with stirring to the solid phase. Thereafter the obtained sample was covered with a layer of silica gel (6 g) and centrifuged at 5000 rpm. The sample after centrifugation was put in a desiccator under dry activated carbon for 24 hours and then fully dried on a Schlenck line. The layer of silica gel was then removed. The sample of starch monolith was slowly heated (25° C./h) to 220° C. on a Schlenck line under high vacuum. Thereafter the sample of Starbon monolith was cooled to room temperature under nitrogen. The resulting Starbon monolith was heated under reflux in toluene, acetone (3 times), ethanol (3 times), ethanol-water solution and acetone again. The sample was dried on a Schlenck-line at room temperature. The properties of the resulting material (denominated Monolith-220) are shown in Table 1. Photographic images of starch and Starbon monolith are shown in FIG. 8.

EXAMPLE 6

Chromatographic Separation Using Starbon

A 15 cm long and 1 cm diameter glass column was packed with Starbon-220 (60 mesh fraction) prepared as for example 5 and used to separate a 18 mg (1/1/1 w/w/w) mixture of ferrocene, acetylferrocene and diacetylferrocene in 0.35 ml of hexane/dichloromethane (3/2 v/v). The column was eluted initially with hexane then a 95/5% hexane/acetone mixture and finally acetone. 57 fractions were collected and analysed by UV-VIS. The results are summarised in FIG. 9.

EXAMPLE 7

Preparation of Starbon-Palladium Catalyst

A mixture of a 0.5 g of Starbon-220 (60 mesh fraction) prepared as for example 2 and a 0.07 g of Pd(Ac)$_2$ was stirred in 15 ml of acetone. The acetone was then removed in a rotary evaporator and the solid fraction was heated under reflux with ethanol for 1 hour. The obtained catalyst was dried in a rotary evaporator and then a Schlenck-line at 170° C.

EXAMPLE 8

Heck Reaction Using Starbon-Pd Catalyst 0.4 g of Starbon-220 catalyst prepared as for example 7, 3.3 ml iodobenzene, 2.7 ml methyl acrylate, 4.2 ml triethylamine and 30 ml xylene were added to a 3 necked flask equipped with a condenser and suba seal through which argon flowed over the reaction mixture. The mixture was stirred at 120° C. for 48 hours. Kinetic data is shown in FIG. 10

EXAMPLE 9

Microwave assisted preparation (T>180° C.) of expanded starch, followed by acid catalysed carbonization allows control of particle morphology of Starbons.

Part 1—Microwave Assisted Preparation of Expanded High Amylose Corn Starch 0.25 g of High Amylose Corn Starch and 5 ml of deionised water were mixed in a 7.5 ml commercial microwave reactor vessel, placed in reactor cavity and the pressure sensor attached. The sample was then heated to the desired temperature (i.e. 90-180° C.) over 150 seconds. Upon returning to atmospheric pressure, the sealed vessel was placed in a refrigerator and left to retrograde at 5° C.

Part 2—Solvent Exchange Procedure

Water was removed from the starch aquagel via a solvent exchange procedure. An initial volume of ethanol (10% v/v with water) was added and stirred for 2 hours. A second volume of ethanol (20% v/v) was then added followed by 2 hours stirring. This was followed by a further addition of ethanol (30% v/v) and another 2 hours stirring. The resulting suspension was allowed to settle (typically overnight) and filtered. The resulting powder was immersed (with stirring) in a volume of ethanol equivalent to the volume of water used in the gelatinisation stage. This was repeated two times. Ethanol was subsequently exchanged with acetone in the same procedure as for water to ethanol. Filtration followed by rotary evaporation was used to remove the bulk of the remaining acetone. The product was dried over night at 50° C. under vacuum.

Part 3—Carbonisation

The resulting porous solid was carbonised at a desired temperature (i.e. 700° C.) via acid assisted carbonisation (e.g. with p-toluene sulphonic acid), following the heating program.

Heating Program:
    Step 1: Room Temperature-140° C.: 10 K/min
    Step 2: 140-270° C.: 5 K/min
    Step 3: 270-350° C.: 2 K/min
    Step 4: 350-700° C.: 10 K/min
    Step 5: Isothermal Hold @ 700° C.: 30 minutes Part 4—Analysis Heating of the starch water suspension above 180° C. coincides with the complete crystallite melting of the amylopectin component, followed by its solubilisation and degredation. GPC analysis shows significant depolymerisation (via $\alpha(1\text{-}6)$ hydrolysis) of amylopectin at temperatures above 170° C., in turn increasing the amylose population.

SEM analysis (FIG. 11) shows the formation of regular spherical particles at 180° C. microwave processing temperature, consistently in the region of 3-6 μm. To the best of our knowledge this is the first report of mesoporous high surface area regular sized particles from starch. The generation of these particles may be particularly beneficial in catalysis and chromatography, where regularity enhances flow and mass transfer efficiency.

TEM analysis, via Strontium tetroxide staining, (FIG. 12) demonstrates that amylopectin acts as the nucleation centre (represented by darkly stained area) on which the development and recrystallisation of amylose into a hierarchial pore structure occurs. The perfection of this recrystallisation increases with increasing processing temperature, eventually culminating in the generation of regular particles at temperatures above 170° C., as a consequence of increased miscibility of amylopectin within the solubilised amylose rich phase as a depolymerisation proceeds.

The key step in the formation of these particles appears to be the dissociation of amylopectin subunits, concurrently with crystallite melting/depolymerisation, allowing a more efficient co-crystallisation during retrogradation.

A sample of expanded starch particles were carbonised (with p-toluene sulphonic acid) at 700° C. (see FIG. 13). The resulting product possessed textural properties comparable with those of previously prepared Starbons (i.e. $S_{BET}$~450-550 $m^2g^{-1}$; Pore Volume~0.6 $cm^3g^{-1}$; Average Pore Diameter>10 nm).

EXAMPLE 10

Starbon® materials prepared according to example 1, but carbonised at temperatures of 400, 700, 800 and 1100° C., were tested in conductivity experiments using a similar system to the one showed in FIG. 14. The Starbon samples were placed in the middle of a plastic cover in between two stainless steel electrodes and pressured until the powder was compact, typically half way through the plastic cover. L was designated as the length of the quantity of Starbon® used for the experiment. Then, an Ohm-meter was employed to measure the resistance of the materials within the electrodes. For this, the two crocodile clips were placed in two different positions of the two electrodes (top and bottom) and the resistance value was recorded. Results are summarised in Table 3 and FIG. 15. Starbon® materials were relatively conductive at preparation temperatures higher than 500° C., and Starbon®-800 and 1100 were found to be very conductive (almost no resistance was found for these samples).

TABLE 3

Electrical resistance of Starbons

| Temperature of preparation, ° C. | R (Ohm) | L (cm) | D (cm) | A ($cm^2$) | ρ (Ohm $m^{-1}$) |
|---|---|---|---|---|---|
| 400 | 6E6 | 1.2 | 1.6 | 1.1304 | 56520 |
| 700 | 1725 | 0.65 | 1.6 | 0.33166 | 8.80181 |
| 800 | 6.3 | 1.4 | 1.6 | 1.5386 | 0.06924 |
| 1100 | 0.95 | 1.95 | 1.6 | 2.98496 | 0.01454 |

Functionalisation of Starbon materials did not significantly affect the Starbons conductivity and all functionalized materials exhibited similar values of conductivity under the same experimental conditions Derivatisation of Starbons and Adding Functionality [Bronsted Acids —HSO3]

EXAMPLE 11

A schematic of the process used to make Starbon-$SO_3H$ is given in FIG. 16 and details of the procedure are given below.

Expanded starch was prepared and solvent exchanged according to Example 1. A solution of para-toluene sulphonic acid in acetone (1 g acid to 1 ml acetone) was added to the solution of expanded starch in acetone. Acetone was removed from the solution in a rotary evaporator at 35° C. The sample was slowly heated (25° C./h) to 350° C. in a Schlenck line under high vacuum. Thereafter the sample was cooled to room temperature under nitrogen. The resulting Starbon was heated under reflux in toluene, acetone (3 times), ethanol (3 times), ethanol-water solution and acetone again. The sample was dried on a Schlenck-line at room temperature. The Starbon was then acidified by stirring with >99% $H_2SO_4$ (10 g/gStarbon) for 3 h at ca. 80° C. The mixture was then filtered and the solid washed with water until neutral. The resulting solid was dried at 100° C. at atmospheric pressure for ca.16 h and subsequently conditioned in boiling toluene (110° C., 3 h) and hot water (80° C., 3 h). The final solid was dried at 100° C. for 16 h prior to use in acid catalysis reactions. Some properties of Starbon acid (350° C.) are given in Table 4.

TABLE 4

Some Properties of Starbon Acids

| | |
|---|---|
| Appearance | Black particulate solid |
| Acidity | ca.1.3 mmol/g [based on $SO_3$10.0/wt % for Starbon (350° C.)] |
| Surface area | >100 $m^2$/g |
| Thermal stability | Loses $SO_3$ at ca. 220° C. |
| Porosity | Mostly mesoporous |

EXAMPLE 12

Starbon acid (250° C.) was prepared as for example 11 but the Starbon was heated at 250° C.

EXAMPLE 13

Starbon acid (600° C.) was prepared as for example 11 but the Starbon was heated at 600° C.

EXAMPLE 14

Native normal corn starch was suspended in distilled water (1 g starch: 5 ml water). The mixture was heated under reflux at 125° C. with stirring in a closed jar for 5 hours. The resultant gel was allowed to retrograde for 5 days at 5° C. Starting from this gel, Starbon acid (350° C.) was prepared as for example 11.

EXAMPLE 15

Reaction Scheme 1: Esterification of succinic acid in aqueous ethanol

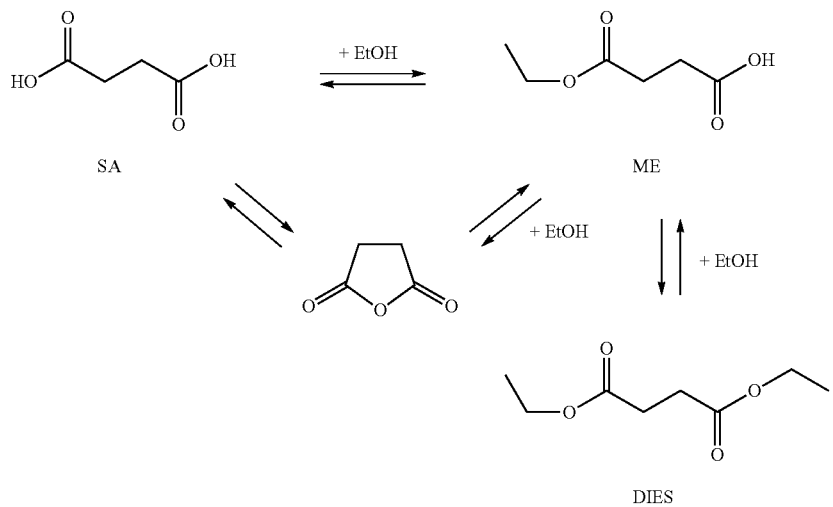

Starbon acid, prepared according to example 11, but with a carbonisation temperature of 400° C. (denominated Starbon acid 400° C.) was compared to other commonly used and commercial solid acid catalysts in the esterification of aqueous succinic acid with ethanol (see Reaction Scheme 1). Succinic acid (10 mmol), water (50 mmol) and ethanol (30 mmol) were stirred together with the solid acid (0.1 g) for up to 24 h at 80° C. Reaction samples were periodically removed and analysed by GC (results were checked by $^1$H NMR). Under these conditions, the reaction using the Starbon acid (400° C.) showed complete conversion of the succinic acid in ca. 2 h. Complete conversion with the other solid acids, that is, β-25 zeolite, β-75 zeolite, sulphated zirconia, montmorillonite KSF in sulphonated commercial carbon (Darco™) required 10 to >23 h, as detailed in Table 5.

Formation of the diester product also occurred more quickly using the Starbon acid (400° C.) with >90% being obtained within 8 h while the other solid acids gave ca 20-50% of the diester in the same period.

TABLE 5

Catalytic activity ($k_{conversion}$) comparison of different materials in the esterification of succinic acid in aqueous ethanol.

| Catalyst | $k_{conversion}$ s$^{-1}$ | Products | Maximum of product yield (mol %) | |
|---|---|---|---|---|
| | | | Yield$_{max}$ (mol %) | $t_{max}$ (min) |
| H$_2$SO$_4$ | 14.2 × 10$^{-5}$ | Monoester | 20 | 90 |
| | | Diester | 90 | 1440 |
| β-25 | 5.5 × 10$^{-5}$ | Monoester | 35 | 840 |
| | | Diester | 70$^a$ | 1440$^a$ |
| DARCO ® | 6.5 × 10$^{-5}$ | Monoester | 52 | 600 |
| | | Diester | 90 | 1150 |
| Starbon ®-400-SO$_3$H | 32 × 10$^{-5}$ | Monoester | 35 | 100 |
| | | Diester | 90 | 410 |

$^a$Reaction not completed

EXAMPLE 16

Four different substrates (succinic, fumaric, levulinic and itaconic acid) were screened in the esterification reaction with ethanol, using Starbon® acid prepared according to example 11, but with a carbonisation temperature of 400° C. 0.1 g of the Starbon catalyst was used, with 10 mmol of the substrate, 30 mmol of ethanol and 50 mmol of water. This yielded a very high efficiency and selectivity for conversion of each substrate to its respective ester. The rates of esterifications of diacids (succinic, fumaric and itaconic) for our Starbon® material were found to be between 5 to 10 times higher than the commercial alternative solid acid catalysts tested (zeolites, sulphated zirconias, acidic clays, etc.). A diester selectivity improvement (from 35-50% range for the majority of the solid acids to >90% for Starbon®-400 at conversion levels of ca. 90%) was also obtained. Starbon® acid also exhibited a superior performance in the esterification reaction of the different acids screened compared to microporous commercial sulphonated carbons (DARCO® and NORIT®, see Table 6 for results), not only in terms of conversion but also in terms of selectivity to the diester (at conversion values of ca 90%, selectivity to the diester was 35% for sulphonated DARCO® compared to the 90% of Starbon®).

EXAMPLE 17

The procedure of Example 16 was repeated using Starbon (350° C.) prepared according to the procedure of Example 11, but the solid catalyst was filtered from the mixture after 0.5 and 1 h. After each filtration, the filtrate was then returned to the reaction conditions and analysed at intervals in the usual way. This showed that the reaction rate returned to the background, i.e. no-catalyst, values thus proving there was no additional activity from soluble acid, leached from the Starbon.

EXAMPLE 18

The solids recovered from the filtrations described in example 17 were added to fresh mixtures of succinic acidethanol-water and gave identical rates of reaction (±5%) to those obtained with the original material. The process described in examples 16 and 17 was then repeated twice more and again, the original catalytic activity was obtained proving good catalyst stability.

EXAMPLE 19

The reaction in example 15 was repeated but under microwave heating rather than using conventional heating. Under a microwave power of 200 W and a temperature of 130° C. 100% conversion of the succinic acid required 5 minutes with Starbon (350° C.) and at least 30 minutes with the other solid acids.

EXAMPLE 20

The reaction in example 15 was repeated but using a smaller quantity of the Starbon acid (350° C.), namely 0.05 g. This led to complete conversion of the succinic acid after ca. 10 h with 40% diester formation.

EXAMPLE 21

The reaction in example 15 was repeated but using a larger quantity of the Starbon acid (350° C.), namely 0.2 g. This led to complete conversion of the succinic acid in less than 2 h and 100% diester formation in 10 h.

EXAMPLE 22

The reaction in example 15 was repeated but at 10% of the concentration of succinic acid. The Starbon acid (350° C.) gave complete conversion of the succinic acid in ca. 2 h and 100% diester formation in ca. 10 h. The other solid acids required ≥23 h to achieve complete conversion of the succinic acid under the same conditions with a maximum of 55% diester achievable in 23 h.

EXAMPLE 23

The reaction in example 15 was repeated but at 70° C. Using the Starbon acid (350° C.), complete conversion of the succinic acid was achieved in ca. 4 h with 30% diester formation.

EXAMPLE 24

The reaction in example 23 was repeated but using twice as much water. Using the Starbon acid (350° C.), complete conversion of the succinic acid was achieved in ca. 10 h with 30% diester formation.

EXAMPLE 25

The reaction in example 24 was repeated but using Starbon acid (250° C.) prepared according to example 12. The reaction rate was lower with 82% conversion of the succinic acid and 20% diester formation after 12 h.

EXAMPLE 26

The reaction in example 24 was repeated but using the Starbon acid (600° C.) prepared according to example 13. The reaction rate was lower with 70% conversion of the succinic acid and 15% diester formation after 12 h.

EXAMPLE 27

The esterification of aqueous succinic acid with methanol using Starbon acid (350° C.) prepared according to example 11 and other solid acid catalysts was studied. A mixture of succinic acid (1 mmol), methanol (30 mmol), water (50 mmol) and the solid acid (0.1 g) was stirred together at 80° C. Samples were withdrawn periodically and analysed by GC (results were checked by $^1$H NMR). With the Starbon acid (350° C.), the conversion of succinic acid and amounts of diester formed were 80% and 8% (0.5 h), 90% and 20% (1 h) and 100% and 30% (2 h). Using β-25 zeolite, the corresponding figures were 26% and 0% (0.5 h), 31% and 0% (1 h) and 40% and 0% (2 h); using sulphated zirconia, the figures were 20% and 0% (0.5 h), 25% and 0% (1 h) and 35% and 0% (2 h).

EXAMPLE 28

The esterification of aqueous fumaric acid with ethanol catalysed by Starbon acid (350° C.), prepared according to example 11, and other solid acids was studied. A mixture of fumaric acid (1 mmol), ethanol (30 mmol), water (50 mmol) and the solid acid (0.1 g) was stirred together at 80° C. Samples were withdrawn periodically and analysed by GC. With the Starbon acid (350° C.), the conversion of fumaric acid and amounts of diester formed were 25% and 10% (2 h), 47% and 25% (4 h) and 100% and 90% (12 h). Using β-25 zeolite, the corresponding figures were 0% and 0% (2 h), <10% and 0% (4 h) and 36% and 42% (17 h); using sulphated zirconia, the figures were 0% and 0% (2 h), 20% and 0% (4 h) and 85% and 45% (17 h); using sulfoned Darco, the figures were 11% and 0% (2 h), 25% and 15% (4 h) and 90% and 70% (17 h).

[Brönsted Acids —COOH]

EXAMPLE 29

Starbon®-350 was synthesized according to the procedure in example 1, but with a carbonisation temperature of 350° C. Then Starbon®-350 (2.5 g) was stirred with 2-cyanoethyl-triethoxysilane (4.3 g, 18 mmol) in toluene (100 mL) under reflux conditions for 12 hours. The grafting of the cyano moieties over the materials surface to form CN-Starbon was corroborated by DRIFT experiments (CN peak at 2252 cm$^{-1}$). The sample was filtered and dried in the oven at 100° C. for 3 hours, then the CN-Starbon® was subsequently hydrolysed by heating it in 50% (v/v) aqueous sulphuric acid at 150° C. for 3 h. After cooling to room temperature, the Starbon® was filtered, washed with an excess of water and dried overnight in the oven at 100° C. DRIFT measurements confirmed the complete disappearance of the CN peak (2252 cm$^{-1}$) whereas the expected COOH peak (1720 cm$^{-1}$) after the CN oxidation was found.

EXAMPLE 30

Starbon®@COOH (350° C.) prepared according to Example 29 was compared to other commonly used and commercial solid acid catalysts in the esterification of aqueous succinic acid with ethanol (see reaction scheme 1). Succinic acid (10 mmol), water (50 mmol) and ethanol (30 mmol) were stirred together with the solid acid (0.1 g) for up to 24 h at 85° C. Reaction samples were periodically removed and analysed by GC (results were checked by $^1$H NMR). Under these conditions, the reaction using the supported Starbon carboxylic acid (350° C.) showed complete conversion of the succinic acid in ca. 2 h. Complete conversion with the other solid acids, namely β-25 zeolite, β-75 zeolite, sulphated zirconia, montmorillonite KSF in sulphonated commercial carbon (Darco™) required 13 to >23 h. Formation of the diester product also occurred more quickly using the Starbon carboxylic acid (350° C.) with >90% being obtained within 8 h while the other solid acids gave ca 30-60% of the diester in the same period.

EXAMPLE 31 with results confirmed by $^1$H NMR. Selectivity and amounts of starting material converted with the various catalysts are given in Table 7. Under these conditions, the reaction using the supported Starbon®@COOH (350° C.) showed complete (>99%) conversion of the propylene oxide in less than 5 min (Table 1), with a high selectivity to oligomers (>40%). Complete conversion with the other solid acids, namely β-25 zeolite and montmorillonite KSF was also found in less than 5 min, but several products were found, predominantly ring

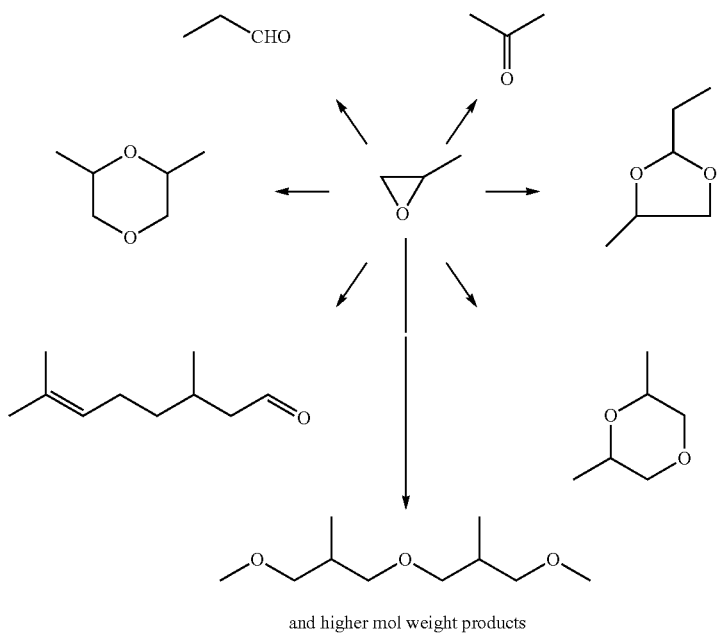

and higher mol weight products

Reaction Scheme 2: Ring Opening, Dimerisation and Oligomerisation Reactions of Propylene Oxide Starbon®@COOH (350° C.) prepared according to Example 29 was compared to other commonly used and commercial solid acid catalysts in the transformation of propylene oxide under microwave conditions. Propylene oxide (20 mmol) was stirred together with the solid acid (0.1 g) and heated under microwave conditions (300 W, 50° C.) over a short period of time (typically between 1 to 5 min). Reaction samples were analysed by GC, to identify the presence of reactants and also the products given in reaction scheme 2, opening products including propionaldehyde and acetone. In the particular case of the β-25 zeolite, propionaldehyde was found to be the major product obtained. Interestingly, when increasing the reaction time from 5 to 15 and 30 min, the selectivity to ring opening products decreased with a concomitant increase in the selectivity to the dimers and oligomers. A similar effect was found for another Bronsted supported Starbon®, Starbon®@SO$_3$H (400° C.), prepared according to Example 11, but at a temperature of 400° C. The reaction did not take place when sulphated zirconia was employed as catalyst.

TABLE 7

Results for ring opening, dimerisation and oligomerisation reactions of propylene oxide.[a]

| CATALYST | mw Time (300 W) | Conversion (mol %) | Selectivity Ring opening* (mol %) | Selectivity dimer/oligomers low mol. weight (mol %) | Selectivity Oligomers Higher mol (mol %) |
|---|---|---|---|---|---|
| Blank | 30 min | — | — | — | — |
| Stb400@SO$_3$H | 1 min | 90 | 75 | 11 | 14 |
|  | 5 min | >99 | 43 | 18 | 40 |
|  | 15 min | >99 | 34 | 35 | 31 |
|  | 30 min | >99 | 24 | 39 | 37 |
| Stb400@COOH | 1 min | 80 | 70 | 15 | 15 |
|  | 5 min | >99 | 32 | 20 | 48 |
|  | 30 min | >99 | 18 | 35 | 47 |
| Al-MCM-48 | 5 min | >99 | Several products (mostly ring opening products) | | |
| Sulphated Zr | 5 min | — | No reaction | | |

TABLE 7-continued

Results for ring opening, dimerisation and oligomerisation reactions of propylene oxide.[a]

| CATALYST | mw Time (300 W) | Conversion (mol %) | Selectivity Ring opening* (mol %) | Selectivity dimer/oligomers low mol. weight (mol %) | Selectivity Oligomers Higher mol (mol %) |
|---|---|---|---|---|---|
| Beta-zeolite | 5 min | >99 | Several products (mostly ring opening products) | | |
| MontKSF | 5 min | >99 | Several products (mostly ring opening products) | | |

[a]Mw conditions: 20 mmol propylene oxide, 0.1 g catalyst, 50° C., 300 W, 5 mins

[Lewis Acids]

EXAMPLE 32

Starbon® supported $ZnCl_2$ (Starbon®@$ZnCl_2$) or $BF_3$ (Starbon@$BF_3$) Lewis supported acid material was prepared as follows: Starbon®-400 was synthesized according to the procedure reported in example 1, at a carbonisation temperature of 400° C. A solution of 10 wt % $ZnCl_2$ or 14% $BF_3$ in methanol was prepared. From this solution, a range of Starbon®@$ZnCl_2$ and Starbon@$BF_3$ supported Lewis acids were prepared by diluting the relevant Lewis acid material to 10, 5 or 2.5 wt % in methanol and stirring with Starbon®-400 for 2 h at 40-50° C. to help the incorporation of the $ZnCl_2$. After cooling to room temperature, the solvent was removed under vacuum, the solid recovered and dried overnight in the oven at 100° C. before its use in the example reactions described below.

EXAMPLE 33

Starbon®@$ZnCl_2$ and Starbon@$BF_3$ (400° C.) supported materials prepared according to example 33 were compared to other commonly used and commercial solid acid catalysts in the esterification of aqueous succinic acid with ethanol (see Reaction Scheme 1), including the Starbon® Bronsted acids. Succinic acid (SA, 1 mmol), water (50 mmol) and ethanol (30 mmol) were stirred together with the solid acid (0.1 g) for up to 24 h at 85° C. Reaction samples were periodically removed and analysed by GC (results were checked by $^1$H NMR). Under these conditions, the reaction using the 10 wt % supported Starbon® Lewis acids (400° C.) showed complete conversion of the succinic acid in ca. 3 h. Complete conversion with the other solid acids, namely β-25 zeolite, β-75 zeolite, sulphated zirconia, montmorillonite KSF in sulphonated commercial carbon (Darco™) required 13 to >23 h. Formation of the diester product (DIES) also occurred more quickly using the Starbon® Lewis acids (400° C.) with 90% being obtained within 12 h while the other solid acids gave ca 30-60% of the diester in the same period. The 5 and 2.5 wt % Starbon® Lewis acids (400° C.) were also found active in this reaction, but their performance was lower compared to that of the 10 wt %. Thus, the 5 wt %-Starbon® Lewis acids (400° C.) gave quantitative conversion in the esterification of succinic acid in aqueous ethanol after 6 h with a diester production of ca.60% after 12 h of reaction. Finally, the 2.5 wt %-Starbon® Lewis acids (400° C.) provided around 85% ($ZnCl_2$) or 70% ($BF_3$) conversion of the acid after 6 h, but the diester production was significantly affected by the low Lewis acid loading, reaching only 45% of the diethylsuccinate after 12 h of reaction. Starbon untreated material only provided a 30% conversion of the succinic acid after 12 h of reaction.

EXAMPLE 34

Reaction Scheme 3: Friendel-Crafts acylation of methyl5-acetylsalicylate

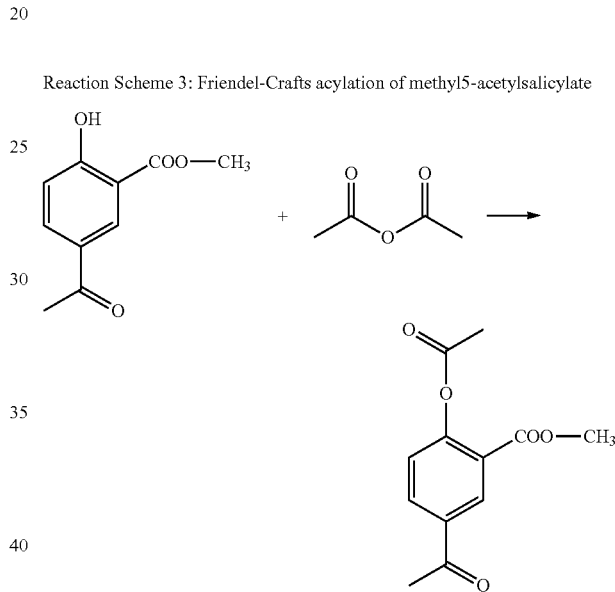

Starbons®@$ZnCl_2$ and Starbons®@$BF_3$ (400° C.) supported materials, prepared according to example 32, were compared to other Starbon® acids (Starbon®@$SO_3H$, prepared according to example 11, but at a temperature of 400° C.) in the Friedel-Crafts acylation of methyl-5-acetylsalicylate with acetic anhydride (see reaction scheme 3). Methyl-5-acetylsalicylate (5 mmol), acetic anhydride (10 mmol) and toluene (5 mL) were stirred together with the solid acid (0.1 g) for up to 12 h at 100° C. Reaction samples were periodically removed and analysed for reactants and products by GC (results were checked by $^1$H NMR), with the percentage conversion and selectivity of reaction summarised in Table 8. The blank reaction (Starbon not functionalised) showed the thermal effects in the reaction were negligible (less than 5% conversion after 24 h). 10 wt %-Starbons Lewis acids (400° C.) gave quantitative conversion of the main acylated product in the OH position after 8 h ($ZnCl_2$) or 10 h ($BF_3$) of reaction, with a complete selectivity to the product. The reaction with the Brönsted supported Starbon®@$SO_3H$ (400° C.) was found to be much quicker, yielding the acylated product with 100% selectivity after 3 h. Lewis supported materials with lower loadings (5 and 2.5 wt % Lewis acid, respectively) were found not active in this reaction.

TABLE 8

Results of Friedel-Crafts acylation of methyl-5-acetylsalicate with acetic anhydride.[a]

| CATALYST | Time | Conversion (mol %) | Selectivity Acylated product (ester) |
|---|---|---|---|
| Blank | 24 h | — | — |
| Stb400@SO₃H | 1 h | 75 | >99 |
|  | 2.5 h | >90 | >99 |
|  | 6 h | >99 | >99 |
|  | 8 h | >99 | >99 |
| Stb-ZnCl₂-10% | 1 h | 50 | >99 |
|  | 2.5 h | 72 | >99 |
|  | 6 h | 90 | >99 |
|  | 8 h | >90 | >99 |
| Stb-ZnCl₂-5% | No reaction |  |  |
| Stb-ZnCl₂-2.5% | No reaction |  |  |
| Stb-BF₃-10 wt % | 1 h | 25 | >99 |
|  | 2.5 h | 55 | >99 |
|  | 6 h | 75 | >99 |
|  | 8 h | 84 | >99 |
| Stb-BF₃-5 wt % | No reaction |  |  |
| Stb-BF₃-2.5 wt % | No reaction |  |  |

[a]5 methyl-5acetylsalicylate, 10 mmol acetic anhydride, 5 mL toluene, 0.1 g catalyst, 100° C.

EXAMPLE 35

Reaction Scheme 4: Friedel-Crafts alkylation of phenyl with cyclohexene

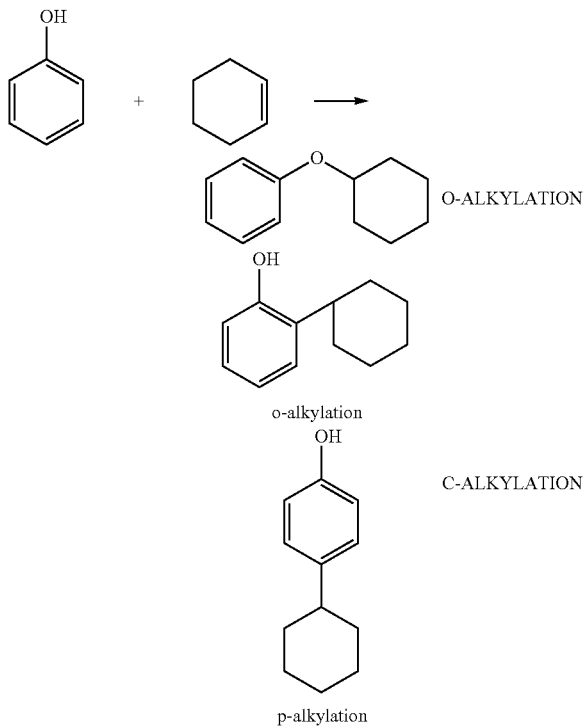

Starbon® Lewis acids (400° C.) supported materials prepared according to Example 32 were compared to other Starbon® acids (Starbon®@SO₃H, prepared according to example 11, but at a temperature of 400° C.) in the Friedel-Crafts alkylation of phenol with cyclohexene (see reaction scheme 4 for the structures of the products). Phenol (1 mmol), acetic cyclohexene (5 mmol) and toluene (3 mL) were stirred together with the solid acid (0.2 g) for up to 24 h at 110° C. Reaction samples were periodically removed and analysed by GC (results were checked by ¹H NMR). Once again, the blank (non-functionalised Starbon) reaction indicated that thermal effects in the reaction were negligible (less than 5% conversion after 24 h). Lewis acid supported Starbons were found to be less active than Brönsted acid supported Starbons and commercially available solid acids such as beta zeolite and sulphated zirconia. The results for the different types of acid modified Starbons are summarised in Table 9.

TABLE 9

Results of Friedel-Crafts Alkylation of phenol with cycolhexene.[a]

| CATALYST | Time | Conversion (mol %) | Selectivity O-alkylation (mol %) | Selectivity (o-) C-alk (mol %) | Selectivity (p-) C-alk (mol %) |
|---|---|---|---|---|---|
| Blank | 24 h | — | — | — | — |
| Stb400@SO₃H | 1 h | 35 | 74 | 21 | 5 |
|  | 4 h | 60 | 71 | 24 | 5 |
|  | 7 h | 72 | 68 | 27 | 5 |
|  | 12 h | >90 | 65 | 30 | 5 |
|  | 4 h | <15 | 82 | 15 | 3 |
| Stb-ZnCl₂ 10 wt % | 7 h | 34 | 80 | 15 | 5 |
|  | 22 h | 60 | 60 | 27 | 13 |
| Stb-BF₃ 10 wt % | 7 h | 15 | >90 | 7 | 3 |
|  | 22 h | 31 | >90 | 5 | 5 |

[a]1 mmol phenol, 2 mmol cyclohexene, 3 mL toluene, 0.2 g catalyst, 110° C.

[Basic Derivatives of Starbons]

EXAMPLE 36

Starbons were synthesized according to the procedure reported in example 1, but with carbonisation temperatures ranging from 200 to 800° C. Base functionalised Starbons were then prepared by reacting the relevant Starbon with 1,3-diaminopropane (10 g/g Starbon®) or benzylamine (10 g/g Starbon®) in toluene under reflux for 24 h. The mixture was then cooled down, filtered and the solid dried at 100° C. at atmospheric pressure for ca.16 h. The Starbon was subsequently conditioned in boiling toluene (110° C., 3 h). The final solid was dried at 100° C. for 16 h prior to reaction.

EXAMPLE 37

Reaction Scheme 5: Knoevenagel reaction of cyclohexanone and ethyl cyanoacetate

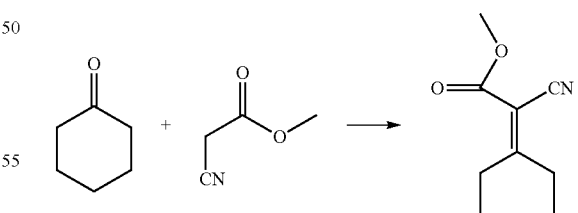

Starbon® basic materials prepared according to example 36 were tested in the Knoevenagel reaction of cyclohexanone and ethyl cyanoacetate (see Reaction Scheme 5 for the structures of reactants and products). 10 mmol (1.036 mL) cyclohexanone and 1.2 mmol (0.123 mL) ethyl cyanoacetate were stirred together with the solid acid (0.05 g) in 15 mL toluene for up to 24 h at 110° C. Reaction samples were periodically removed and analysed by GC using dodecane as internal standard (results were checked by ¹H NMR). Under these conditions, quantitative conversion (>90%) was found after 16 h (Starbon-1,3-diaminopropane) or 12 h (Starbon-benzylamine) of reaction using the Starbon-500 basic materials with an almost complete selectivity to the product of condensation (see above).

Interestingly, the same reaction performed with the Starbon-350° C. materials was almost twice as fast as that of the respective Starbon-500° C., achieving quantitative conversion after 10 h of reaction (Starbon-1,3-diaminopropane) or 7-8 h (Starbon-benzylamine) with >95% selectivity to the desired product. Compared to these Starbon® basic mesoporous materials, aminopropylsilicas previously reported to work in the Knoevenagel reaction, provided a very poor conversion (<30%) of the starting material under the reaction conditions (110° C., 8 h).

EXAMPLE 38

Reaction Scheme 6: Michael reaction of 2-cyclohexene-1-one and nitromethane

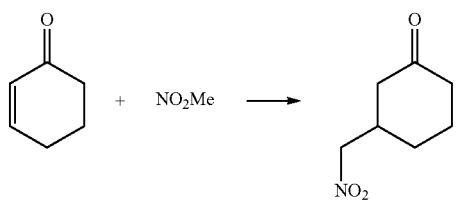

Starbon® basic materials prepared according to Example 36 were tested in the Michael reaction of 2-cyclohexen-1-one and nitromethane (see Reaction Scheme 6 for the structures of reactants and products). 10 mmol (0.97 mL) 2-cyclohexen-1-one and 15 mL nitromethane (acting as both substrate and solvent) were stirred together with the solid acid (0.05 g) under reflux (~100° C.) for up to 24 h. Reaction samples were periodically removed and analysed by GC using dodecane as internal standard (results were checked by ¹H NMR). Under these conditions, quantitative conversion (>90%) was found after 24 h of reaction using the Starbon®-1,3 diaminopropane (500° C.) and after 16 h of reaction using the Starbon®-benzylamine (500° C.), with an almost complete selectivity to condensation product (see above).

Interestingly, the same reaction performed with the Starbon-350° C. materials was almost twice as fast as that of the respective Starbon-500° C. materials, achieving quantitative conversion after 15 h of reaction (Starbon-1,3-diaminopropane) or 10 h (Starbon-benzylamine) with >95% selectivity to the desired product. Compared to these Starbon® basic mesoporous materials, aminopropylsilicas previously reported provided a very poor conversion (<50%) of the starting material under the reaction conditions (100° C., 16 h).

[Pd Doped Starbon]

EXAMPLE 39

Starbon was prepared according to Example 1, but with a carbonisation temperature of 300° C. 0.3 g of this Starbon was stirred with a solution of palladium acetate (10% by weight, 30 mg) in 5 mL of acetone. The resultant mixture was heated under microwave irradiation for 10 mins at 140° C. at 200 W. The solid was then filtered, washed with acetone and dried in the oven at 100° C. for 12 h. The incorporation of Pd nanoparticles into the Starbon structure can be observed in TEM micrographs (see FIG. 17).

EXAMPLE 40

Reaction Scheme 7: Heck reaction under microwave conditions

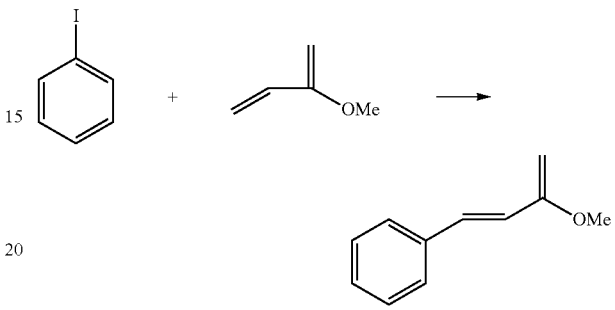

Starbon®-Pd(10% wt) was prepared according to example 39 and was tested in the Heck reaction of iodobenzene and methyl acrylate (see Reaction Scheme 7). Iodobenzene (8 mmol, 0.85 mL), methyl acrylate (8 mmol, 0.70 mL), triethylamine (5 mmol) and the Starbon-Pd catalyst (0.050 g) were mixed together in a microwave tube and placed in a Microwave reactor under stirring at 70° C. for 5 min. The microwave power employed in the reaction was 300 W. Dodecane (1 mmol) was employed as internal standard and results were analysed by GC. The Starbon-Pd material afforded complete (>99 mol %) conversion of the starting material with a selectivity higher than 80 mol % to the cross-coupled product, methyl cinnamate in 5 min.

EXAMPLE 41

Reaction Scheme 8: Sonogashira reaction under microwave conditions

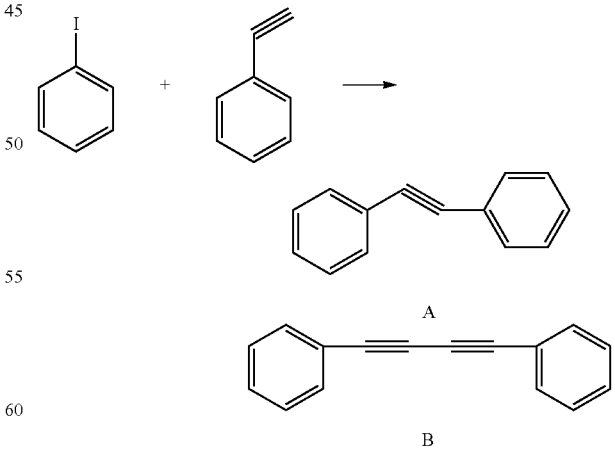

Starbon®-Pd(110% wt) was prepared according to example 39 and was tested in the Sonogashira reaction of iodobenzene and phenyl acetylene (see Reaction Scheme 8). Iodobenzene (2 mmol), phenyl acetylene (1 mmol), 1,4-diazabicyclo(2.2.2)octane (DABCO, 2 mmol) and the Starbon-Pd catalyst (0.050 g) were mixed together in a microwave tube and placed in a Microwave reactor under stirring at 110° C. for approx. 5 min. The microwave power employed in the reaction was 300 W. The Pd-Starbon material afforded quantitative conversion of the starting material (>90 mol % conversion) with a selectivity close to 75 mol % to the cross-coupled product (A), and 25% of the homocoupling product (B).

[Starbons with Various Heteroatom Functionality]

EXAMPLE 42

Starbons were prepared according to example 1 at carbonisation temperatures of 300 and 500° C. and then reacted with various protic reagents (listed in the modifier column of Table 10) to introduce either P, S or F heteroatom functionalities to the surface of the Starbon.

The modifications were performed under different sets of conditions, including conventional heating and microwaves.

Microwave Condition of Modifications:

the direct reactions of the same protic reagents (0.8 g) with the Starbons (0.4 g) (see Table 10). Under moderate conditions (<40 minutes, <150° C.), the method proved to be extremely effective with all of the reactants giving moderate to good loadings of the different species on to the Starbons®. Comparison between dTG profile (sample mass loss with time) of parent Starbons (prepared at 300 and 500° C.) and Starbon after modification are shown at FIG. 18. Comparisons between Starbon FT-IR spectra before and after modification are shown in FIG. 19 for the diphenylphosphinic $(C_6H_5)_2P(O)$ functional group and FIG. 20 for the C5H11S-functional group.

TABLE 10

Incorporation of P, S or F protic reagents into Starbons

| Starbon temperature preparation | Modifier | Methodology of modification | Loading |
|---|---|---|---|
| 300° C. | $(C_6H_5)_2P(O)Cl$ | MW/90° C./30 min/Pyridine | 3.5% |
| 300° C. | $C_2H_5OPCl_2$ | MW/80° C./30 min | 4.3% |
| 300° C. | $C_2H_5OPCl_2$ | MW/140° C./30 min | 5.7% |
| 500° C. | $CH_3(CH_2)_4SH$ | MW/130° C./40 min | 4.0% |
| 500° C. | $CF_3CH_2OH$ | MW/70° C./30 min | 2.1% |
| 500° C. | $C_3F_7CH_2OH$ | MW/140° C./30 min | 1.6% |

The loadings for F, P and S in the Starbon modified materials were typically in the range of 1.6 to 5.7%, as indicated in Table 10.

The mesoporous structure of the Starbon was maintained after modification with the heteroatom groups, as can be seen from the data presented in Table 11.

TABLE 11

Texture properties of some Starbon after modification.

| Starbon temperature preparation | Modifier | $S_{BET}$ m²/g | Volume micropore | Volume mesopore | Diameter nm |
|---|---|---|---|---|---|
| 300° C. | $(C_6H_5)_2P(O)Cl$ | 54.0 | 0.00 | 0.17 | 11.6 |
| 500° C. | $CH_3(CH_2)_4SH$ | 260 | 0.07 | 0.20 | 6.4 |
| 500° C. | $C_3F_7CH_2OH$ | 254 | 0.07 | 0.28 | 6.8 |

[Composites]

EXAMPLE 43

Preparation of Silica/Starbon Composite can be Performed as Follows:

During the solvent exchange process in the preparation of expanded high amylose corn starch, at approximately 50/50 water: ethanol content of the system, tetraethoxy orthosilicate is added (1/1 g:g with starch) and allowed to homogenize for 2 hours. Then a catalytic amount of triethylamine was added (e.g. 0.01% by volume), and the resulting suspension allowed to stir overnight. The solvent exchange procedure (Water → Ethanol) was then continued until all water was replaced by ethanol, upon which the sample was filtered and re-immersed in 100% ethanol and again stirred. This last step was repeated 3 times as to ensure removal of any residual base. The samples were then filtered and dried in a vacuum oven overnight at 80° C., to remove bound ethanol. The resulting material was then carbonized by heating to 700° C. under a nitrogen atmosphere according to the heating program given below, to produce a carbonaceous material. The textural properties confirmed that the composite materials obtained had a mesoporous structure (average pore diameter ~4.3 nm). The resulting material was also characterised by SEM analysis (FIG. 21) and the FT-IR spectrum indicated the incorporation of Si—O and C—C in the composite (FIG. 22). (NB: The catalyst was only included to enhance the incorporation of silica in the mesoporous structure, it was not used to used to induce carbonization.)

a) Heating Program:

Step 1: Room Temperature-140° C.: 10 K/min

Step 2: 140-270° C.: 5 K/min

Step 3: 270-350° C.: 2 K/min

Step 4: 350-700° C.: 10 K/min

Step 5: Isothermal Hold @ 700° C.: 30 minutes b) Textural Properties $S_{BET}$~320 m²g⁻¹

Total Pore Volume~0.334 cm³g⁻¹

Average Pore Diameter (from BET equation)~4.3 nm

EXAMPLE 44

A Starbon/Chitosan Composite can be Prepared as Follows:

Subsequent to the gelatinization of high amylose corn starch as described in Example 1, chitosan (10% by mass of starch used) was added to the resulting solution. This was them allowed to recrystallise/retrograde at 5° C. The product was then solvent exchanged with ethanol to remove water and dried in a vacuum oven overnight at 50° C. The resulting solid was then carbonized at 330° C., via heating under a nitrogen atmosphere at 5 K/min. The FT-IR spectrum (FIG. 23) indicates the incorporation of both C—N and aromatic C—C into the resulting solid. Elemental Analysis of the resulting solid demonstrated an increase in the nitrogen atom content by ~2% compared to Starbon prepared according to Example 1. The textural properties were as follows:

$S_{BET}$~30 m²g⁻¹

Total Pore Volume~0.21 cm³g⁻¹

Average Pore Diameter (from BET equation)~27.8 nm

[Metal Adsorption]

EXAMPLE 45

Starbon-800 (0.3 g), prepared according to Example 1, but at a carbonisation temperature of 800° C., was stirred with a solution of either 1000 ppm or 20 ppm of Cu(II) in water (ca 10 mL, standard solution) overnight at room temperature. After stirring, the mixture was filtrated through a microfilter (0.22 μm) and analysed by atomic absorption. A series of Cu(II) standard solutions in water (40 ppm, 20 ppm, 10 ppm and 0 ppm Cu(II), respectively) were prepared as calibration standards to estimate and quantify the results.

Results showed Starbon-800 (0.3 g) reduced a 20 ppm solution of Cu(II) in water (10 mL) to 10.84 ppm of Cu(II), thus almost half of the initial quantity of Cu in solution was trapped by the Starbon material.

Interestingly, when a 1000 ppm solution of Cu(II) in water (10 mL) was used, the Starbon material (0.3 g) was able to trap more than 95% of the Cu present in solution, leaving a final concentration of 13.50 ppm of Cu(II) in water.

EXAMPLE 46

Starbon-800 (0.3 g), was prepared according to Example 1, but at a carbonisation temperature of 800° C., was stirred with a solution of either 1000 ppm or 20 ppm of Fe(III) in water (ca 10 mL, standard solution) overnight at room temperature. After stirring, the mixture was filtrated through a microfilter (0.22 μm) and analysed by atomic absorption. A series of Fe(III) standard solutions in water (40 ppm, 20 ppm, 10 ppm and 0 ppm Fe(III), respectively) were prepared as calibration standards to estimate and quantify the results.

Results showed Starbon-800 (0.3 g) reduced a 40 ppm solution of Fe(III) in water (10 mL) to 9.99 ppm of Fe(III), thus approximately 75% of the initial quantity of Fe in solution was trapped by the Starbon material.

Interestingly, when a 1000 ppm solution of Fe(III) in water (10 mL) was used, the Starbon material (0.3 g) was able to trap more than 95% of the Fe present in solution, leaving a final concentration of 17.36 ppm of Fe(III) in water.

[Use of Different Acids to Catalyse Starbon Formation]

EXAMPLE 47

Starbons were prepared following the procedure of Example 1, but with different organic acids (1 g acid to 1 mL acetone) added to the expanded starch at the start of Part 3 (carbonisation) and different temperatures of carbonisation (see Table 12). The role of this acid is to act as a dopant in Starbon formation. It was found that when strong aromatic organic acids (eg para-toluene-sulphonic acid and benzene-sulphonic acid) were used Starbons were formed, but when strong aliphatic organic acids (eg methane-sulphonic acid) were used only non-Starbon materials with low surface areas were obtained, as is confirmed by the data presented in Table 12.

TABLE 12

Properties of Starbons prepared with dopant acids

| Starbon temperature preparation | Acid | $S_{BET}$ $m^2/g$ | Volume $cm^3/g$ micropore | mesopore | Diameter nm |
|---|---|---|---|---|---|
| 450 | $CH_3$—$C_6H_5$—$SO_3H$ | 475 | 0.16 | 0.39 | 4.8 |
| 450 | $C_6H_5$—$SO_3H$ | 431 | 0.14 | 0.24 | 3.5 |
| 220 | $CH_3$—SO3H | 1 | 0 | 0 | — |

[Carbonisation of Starbon in Liquid Phase]

EXAMPLE 48

20 g of High Amylose Corn Starch was thermally expanded and solvent exchanged according to the procedures in Part 1 and Part 2 of Example 1. The starch was mixed with 0.8 g of para-toluene sulphonic acid in acetone solution (30 ml) and the solution was added drop wise to hot dodecane (150° C.). The reaction took place under a nitrogen atmosphere and the temperature of the solution was increased from 150 to 220° C. at the start of this procedure. After 3 h the solution was left to cool to room temperature and the sample was dried on a Schlenck-line. The resulting Starbon material had the following properties:

$S_{BET}$=306 $m^2/g$
$V_{micropore}$=0.04 $cm^3/g$
$V_{mesopore}$=0.75 $cm^3/g$
$D_{average}$=3.1 nm This indicates that Starbons may also be synthesised by carbonisation in solution.

EXAMPLE 49

Starbon®@$SO_3H$ was prepared according to Example 11, but with a carbonisation temperature of 400° C. The resulting Starbon acid catalyst was tested in the acylation reaction of aromatic amines (listed in the substrate column of Table 13) with acetic acid performed under microwave conditions. The results obtained with the Starbon Acid catalyst are given in Table 13. The blank reaction (no catalyst) gave a very poor reaction conversion efficiency compared to the Starbon® catalysed one. The Starbon Acid catalysed reaction was completed in 10 minutes or less, with a >90% selectivity to the acylated product (Table 13).

The Starbon®-400-$SO_3H$ catalysed aniline acylation reaction was compared to the same reaction performed with other commonly used and commercial solid acids catalysts, with the results obtained summarised in FIG. 24. The rate of reaction with Starbon®-400-$SO_3H$ was found to be between 4 to 10 times greater than any of the reactions with commercial catalysts [microporous beta-25 zeolite ($SiO_2$/$Al_2O_3$ ratio 25), mesoporous Al-MCM-41 and acidic Montmorillonite KSF] and twice as fast as similar sulphonated microporous carbonaceous materials.

EXAMPLE 50

TABLE 1

Amines acylation with acetic acid on Starbon ®-400-SO$_3$H under microwave conditions[a]

| Entry | Substrate | Time (s) | Conversion (mol %) | Amide selectivity (mol %) |
|---|---|---|---|---|
| blank | C$_6$H$_5$-CH$_2$-NH$_2$ | 900 | <5 | >98 |
| 1 | C$_6$H$_5$-CH$_2$-NH$_2$ | 40 | >99 | >99 |
| 2 | cyclohexyl-NH$_2$ | 60 | >99 | >99 |
| 3 | 4-O$_2$N-C$_6$H$_4$-NH$_2$ | 120 | >99 | >98 |
| 4 | C$_6$H$_5$-NH$_2$ | 600 | 90 | >99 |

[a]2 mmol amine, 2 mmol HAc, 0.1 g Starbon-400-SO$_3$H, 300 W, 130° C.

Starbon was prepared according to the procedure of Example 1, but with a carbonisation temperature of 400° C. The resulting Starbon was acidified by stirring with >99% H$_2$SO$_4$ (10 g/g Starbon®) for either 10 min, 40 min or 1 h 30 min at ca.80° C. The mixture was then filtered and the solid washed with water until neutral. The resulting solid was dried at 100° C. at atmospheric pressure for ca.16 h and subsequently conditioned in boiling toluene (110° C., 3 h) and hot water (80° C., 3 h). The final solid was dried at 100° C. for 16 h prior to use as an acid catalyst. The Starbon acid catalyst obtained at different sulphonation times were then tested with the model esterification reaction of succinic acid with aqueous ethanol (Reaction Scheme 1).

Succinic acid (10 mmol), water (50 mmol) and ethanol (30 mmol) were stirred together with the relevant Starbon Acid catalyst (0.1 g) for up to 24 h at 80° C. Reaction samples were periodically removed and analysed by GC, with results by $^1$H NMR. The results obtained are given in Table 14.

In general, the length of the sulphonation time did not affect, significantly, the activity and selectivity of the Starbon acid catalyst materials in the model reaction at sulphonation times longer than 1.5 h. It is likely that this is due to near saturation of SO$_3$H loading on the Starbon ~400° C. material by 1.5 hr (see data below). Quantitative conversion was found for all samples after 5 h of reaction (Table 14). Interestingly, in terms of selectivity, sulphonation times of ca.1.5 h provided the best selectivities to the diethyl succinate formation (ca 60%) after 5 h and also the quantitative yield to the diester was reached at quicker reaction times (7 h compared to 8 h or 10 h for other sulphonation levels).

TABLE 14

Starbon Starbon ®-400-SO$_3$H level of sulphonation.[a]

| CATALYST | Conversion at 4 h 30 min (mol %) | Diester sel. (mol %) | Time to Max yield of monoester | Max yield of diester (and time taken) |
|---|---|---|---|---|
| Stb400-10 min | >90 | 38 | 65 (2 h) | >99 (10 h) |
| Stb400-40 min | >99 | 45 | 40 (1 h 30 m) | >99 (<10 h) |
| Stb400-1 h30 m | >99 | 54 | 45 (2 h) | >99 (7 h) |
| Stb400-3 h30 m | >99 | 44 | 40 (2 h) | >99 (8 h) |

[a]1 mmol succinic acid, 30 mmol EtOH, 50 mmol H$_2$O, 0.1 g Starbon-400-SO$_3$H, 80° C.

SO$_3$H loading levels on Starbons after different sulphonation times:
Stb400-10 min—0.34 mmol g$^{-1}$ Starbon
Stb400-40 min—0.40 mmol g$^{-1}$ starbon
Stb400-1 h30 m—0.49 mmol g$^{-1}$ starbon
Stb400-3 h30 m—0.52 mmol g$^{-1}$ starbon

EXAMPLE 51

The esterification procedure of Example 16 was repeated for succinic, fumaric and itaconic acid, using Starbon®-SO$_3$H prepared according to example 11, but with carbonisation at a range of temperatures from 300 to 750° C. The resulting data was used to provide a plot of normalised catalytic activity against temperature of Starbon Acid catalyst preparation for each of the substrates (see FIG. 25).

The most outstanding feature of the Starbon®-SO$_3$H catalysis is the substrate-dependent maximum of catalytic activity (FIG. 25). Activities peaked at ca 400° C. for succinic acid (k=32×10$^{-5}$ s$^{-1}$), 450° C. for fumaric acid (k=5.0×10$^{-5}$ s$^{-1}$) and 550° C. for itaconic acid (k=15.4×10$^{-5}$ s$^{-1}$).

The physical properties of the three diacids are significantly different (Table 15) and in particular, the polarity of itaconic acid and derivatives are substantially different to fumaric and succinic acids ones. This may influence the adsorption/desorption processes that take place on the Starbons® surface, explaining the different optimum temperatures of catalyst preparation.

TABLE 15

Reaction rate constants (k, s$^{-1}$), physical properties [acidity, pK$_1$ and pK$_2$; dipole moment of the acid ($\mu_{acid}$) and the monoester ($\mu_{mono}$)] and position of the maximum catalytic activity (Peak position) for the different diacids screened in the esterification reaction.

| Acid | k s$^{-1}$ | pK$_1$ | pK$_2$ | $\mu_{acid}$ | $\mu_{mono}$ | Peak position |
|---|---|---|---|---|---|---|
| Succinic | 32 × 10$^{-5}$ | 4.19 | 5.57 | 0.00 | 0.71 | 400° C. |
| Itaconic | 15 × 10$^{-5}$ | 3.84 | 5.55 | 3.23 | 3.63 | 550° C. |
| Fumaric | 5 × 10$^{-5}$ | 3.03 | 4.47 | 2.50 | 2.87 | 450° C. |

EXAMPLE 52

Part 1—Preparation of Expanded Starch
100 g of Starch (e.g. High amylose corn, Corn, Wheat or Potato) and 2 L of deionised water was stirred at 700 rpm for ten minutes in a modified household pressure cooker prior to heating (Volume=3 L; Operating conditions 120° C./80 kPa). The lid component of the device was modified with an aluminium enclosure facilitating insertion of a thermocouple. The system was heated to 120° C. (30 minutes) and held at this temperature for a further forty five minutes. Upon returning to atmospheric pressure, the lid was detached, and the resulting solution decanted into powder drying jars. The vessels were then sealed and the gels retrograded at 5° C.

Part 2—Solvent Exchange

Water was removed from the starch aquagel via a solvent exchange procedure. An initial volume of ethanol (10% v/v with water) was added and stirred for 2 hours. A second volume of ethanol (20% v/v) was then added followed by 2 hours stirring. This was followed by a further addition of ethanol (30% v/v) and another 2 hours stirring. The resulting suspension was allowed to settle and filtered. The resulting powder was immersed (with stirring) in a volume of ethanol equivalent to the volume of water used in the gelatinisation stage. This was twice repeated. Ethanol was subsequently exchanged with acetone in the same procedure as that for water to ethanol. Filtration followed by rotary evaporation was used to remove the bulk of the remaining acetone. The product was dried over night at 50° C. in a vacuum oven.

Part 3—Conversion of Expanded Starch to Starbon and —$SO_3$ Functionalisation

A solution of p-toluene sulphonic acid in acetone (1 g acid to 1 ml acetone) was added to the solution of expanded starch in acetone. Acetone was removed from the solution in a rotary evaporator at 35° C. The sample was slowly heated (25° C./h) to 400° C. in a Schlenk line under high vacuum. Thereafter the sample was cooled to room temperature under nitrogen. The resulting Starbon® was heated under reflux in toluene, acetone (3 times), ethanol (3 times), ethanol-water solution and acetone again. The sample was dried on a Schlenk-line at room temperature. The Starbon® is then acidified by stirring with >99% $H_2SO_4$ (10 g/g Starbon®) for 3 h at ca. 80° C. The mixture was then filtered and the solid washed with water until neutral. The resulting solid dried at 100° C. at atmospheric pressure for ca.16 h and subsequently conditioned in boiling toluene (110° C., 3 h) and hot water (80° C., 3 h). The final solid was dried at 100° C. for 16 h prior to reaction.

Part 4—Catalytic Activity of Starbons from Different Starches

The different Starbon® materials were carbonized at 400° C. and then tested in the model reaction (esterification of succinic acid in aqueous ethanol, Reaction Scheme 1). Succinic acid (10 mmol), water (50 mmol) and ethanol (30 mmol) were stirred together with the solid acid (0.1 g) for up to 24 h at 80° C. Reaction samples were periodically removed and analysed by GC (results were checked by $^1$H NMR). Under these conditions, the reaction using the high amylose corn and the corn starch carbonaceous materials at 400° C. showed the best results in terms of conversion and selectivity to the diester compared to wheat and potato carbonized materials (Table 16). Quantitative conversion was achieved for the high amylose corn Starbon-400 in less than 4 h and a complete selectivity to the diester was found after 8 h, similar results to those obtained for the corn Starbon-400 which exhibited a slightly better performance (quantitative conversion after ca. 3 h), including a full selectivity to the diester in a shorter period of time (ca.6 h). Wheat and potato Starbons-400 were similarly active in the esterification of succinic acid in aqueous ethanol, although they exhibited a lower performance in the reaction compared to high amylose and corn Starbons.

TABLE 16

Result for Starbon-$SO_3$ from different types of starch as a catalyst for succinic acid esterification.[a]

| CATALYST | Time | Conversion (mol %) | Diester sel. (mol %) | Max yield (monoester) | Max yield (diester) |
|---|---|---|---|---|---|
| High-amylose400 | 4 h 30 min | >99 | 44 | 40 (2 h) | >99 (8 h) |
| CORN-400 | 4 h 30 min | >99 | 60 | 45 (1 h) | >99 (<7 h) |
| WHEAT-400 | 4 h 30 min | 90 | 35 | 55 (1 h) | 85 (12 h) |
| POTATO-400 | 4 h 30 min | 80 | 25 | 65 (1 h) | 65 (12 h) |

[a] 1 mmol succinic acid, 30 mmol EtOH, 50 mmol $H_2O$, 0.1 g catalyst, 80° C.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of preparing a mesoporous carbonaceous material comprising carbonisation of a polysaccharide material, wherein the polysaccharide material comprises one or more expanded retrograded high surface area starches, the preparation of the one or more expanded retrograded high surface area starches comprising the steps of:
   (i) gelatinising the starch or starches in the presence of water to give a starch/water gel;
   (ii) allowing the starch or starches to retrograde; and
   (iii) exchanging the water in the retrograded starch or starches with a water miscible non-solvent for starch which has a lower surface tension than water.

2. The method of claim 1 wherein the carbonisation step is carried out at a temperature of at least about 100° C.

3. The method of claim 2 wherein the carbonisation step is carried out at a temperature in the range of from about 100° C. to about 1200° C.

4. The method of claim 2 to the carbonisation step is carried out at a temperature in the range of from about 100° C. to about 700° C.

5. The method of claim 4 wherein the carbonisation step is carried out at a temperature in the range of from about 100° C. to about 170° C.

6. The method of claim 4 wherein the carbonisation step is carried out at a temperature in the range of from about 100° C. to about 450° C.

7. The method of claim 6 wherein the carbonisation step is carried out at a temperature in the range of from about 150° C. to about 220° C.

8. The method of claim 4 wherein the carbonisation step is carried out at a temperature in the range of from about 300° C. to about 700° C.

9. The method of claim 4 wherein the carbonisation step is carried out at a temperature of about 600° C. or more.

10. The method of claim 1 wherein the material retains chemical structural elements of the polysaccharide from which it is derived.

11. The method of claim 10 wherein the material retains polysaccharide-derived oxygen-containing functions.

12. The method of claim 10 wherein the material retains polysaccharide-derived hydroxyl functions.

13. The method of claim 1 wherein the material has aromatic character.

14. The method of claim 1 wherein the material retains a pore structure similar to that of the polysaccharide from which it is derived.

15. The method of claim 1 further comprising the step of functionalising or derivatising the carbonaceous material.

16. The method of claim 15 wherein the functionalisation or derivatising step includes chemically binding functional moieties or immobilising functional moieties within the material.

17. The method of claim 16 wherein the functional moiety is a catalytically active moiety.

18. The method of claim 16 wherein the functional moiety is selected from the group consisting of Brönsted acids, Lewis acids, bases, metals and metal containing moieties.

19. The method of claim 16 wherein the moiety includes one or more hetero-atoms.

20. The method of claim 19 wherein the hetero-atoms are selected from the group consisting of B, P, S, halogen, N and Si.

21. The method of claim 1, wherein the water miscible non-solvent for starch comprises ethanol, methanol, or acetone.

22. The method of claim 1, wherein the water miscible non-solvent for starch comprises ethanol.

23. A method of preparing a mesoporous carbonaceous material comprising:
  (i) providing one or more high surface area starches;
  (ii) gelatinising the starch or starches in the presence of water to give a starch/water gel;
  (iii) allowing the starch or starches to retrograde;
  (iv) exchanging the water in the retrograded starch or starches with a water miscible non-solvent for starch which has a lower surface tension than water;
  (v) drying the expanded retrograded high surface area starch or starches; and
  (vi) subjecting the thus obtained expanded retrograded high surface area starch or starches to a carbonisation treatment.

* * * * *